(12) United States Patent
Maruyama et al.

(10) Patent No.: US 10,631,043 B2
(45) Date of Patent: Apr. 21, 2020

(54) RECEIVING DEVICE AND METHOD, AND COMMUNICATING SYSTEM

(71) Applicant: Sony Corporation, Tokyo (JP)

(72) Inventors: Hirofumi Maruyama, Tokyo (JP); Noriaki Ooishi, Kanagawa (JP); Yuichi Hirayama, Chiba (JP); Satoshi Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/777,866

(22) PCT Filed: Nov. 11, 2016

(86) PCT No.: PCT/JP2016/083479
§ 371 (c)(1),
(2) Date: May 21, 2018

(87) PCT Pub. No.: WO2017/090463
PCT Pub. Date: Jun. 1, 2017

(65) Prior Publication Data
US 2018/0352290 A1 Dec. 6, 2018

(30) Foreign Application Priority Data

Nov. 27, 2015 (JP) .................................. 2015-232434
Jun. 9, 2016 (JP) .................................. 2016-114977

(51) Int. Cl.
*H04N 21/438* (2011.01)
*H04J 3/16* (2006.01)
(Continued)

(52) U.S. Cl.
CPC ........... *H04N 21/4381* (2013.01); *H04J 3/00* (2013.01); *H04J 3/16* (2013.01); *H04J 3/1605* (2013.01);
(Continued)

(58) Field of Classification Search
CPC ... H04J 3/00; H04J 3/16; H04J 3/1605; H04L 1/00; H04L 1/0047; H04N 21/4381; H04N 21/438; H04N 21/23608; H04N 21/4348
See application file for complete search history.

(56) References Cited

U.S. PATENT DOCUMENTS

| 10,225,379 B2 * | 3/2019 | Michael | H04N 21/2381 |
| 2012/0140769 A1 * | 6/2012 | Hwang | H04L 65/602 370/389 |

(Continued)

FOREIGN PATENT DOCUMENTS

| JP | 10-313281 A | 11/1998 |
| JP | 2000-040311 A | 2/2000 |

(Continued)

*Primary Examiner* — Brian D Nguyen
(74) *Attorney, Agent, or Firm* — Michael Best & Friedrich LLP

(57) ABSTRACT

Communication reception that enables reception of a packet which may not contain an error without invalidating the same is disclosed. In one example, an information analyzing unit analyzes a data string and frame/slot information, and supplies TMCC information, slot header information, and data length information to a packet length indicating unit and a packet dividing unit. The packet length indicating unit defines the packet length in advance, and indicates the defined packet length to the packet dividing unit. The packet dividing unit performs packet division on the basis of the packet length obtained from the TMCC information, the slot header information, the data length information and the like from the information analyzing unit, and the packet length defined by the packet length indicating unit.

20 Claims, 38 Drawing Sheets

(51) Int. Cl.
*H04L 1/00* (2006.01)
*H04N 21/236* (2011.01)
*H04N 21/434* (2011.01)
*H04J 3/00* (2006.01)

(52) U.S. Cl.
CPC .......... *H04L 1/0047* (2013.01); *H04L 1/0084* (2013.01); *H04N 21/23608* (2013.01); *H04N 21/438* (2013.01); *H04N 21/4348* (2013.01)

(56) References Cited

U.S. PATENT DOCUMENTS

2012/0281618 A1* 11/2012 Zheng ................. H04L 12/5601
370/328
2015/0229367 A1* 8/2015 Hwang ............... H04L 27/2627
375/267
2018/0019903 A1* 1/2018 Hwang .................... H04L 1/00

FOREIGN PATENT DOCUMENTS

| JP | 2002-077243 A | 3/2002 |
|---|---|---|
| JP | 2005-229587 A | 8/2005 |
| JP | 2008-193601 A | 8/2008 |
| JP | 2009-201117 A | 9/2009 |
| JP | 2015-156636 A | 8/2015 |

\* cited by examiner

FIG. 37

| | PACKET BREAK POSITION FROM TMCC INFORMATION (ERROR TOLERANCE: STRONG) | PACKET BREAK POSITION FROM HEADER INFORMATION (ERROR TOLERANCE: MEDIUM) | PACKET LENGTH (ERROR TOLERANCE: MEDIUM) |
|---|---|---|---|
| ADVANCED BS BROADCASTING (Slot → TLV) | TMCC INFORMATION (INDICATE FIRST AND LAST PACKET BOUNDARIES IN SLOT) | SLOT HEADER (INDICATE FIRST PACKET BOUNDARY IN SLOT) | TLV HEADER (INDICATE PACKET LENGTH OF THIS TLV) |
| CABLE RETRANSMISSION ISDB-C (DIVIDED TLV → TLV) | (NOT PRESENT) | DIVIDED TLV HEAD/ PAYLOAD (INDICATE HEAD PACKET BOUNDARY IN DIVIDED TLV) | TLV HEADER (INDICATE PACKET LENGTH OF THIS TLV) |
| CABLE RETRANSMISSION J.382 (BB Frame → GSE) | (NOT PRESENT) | BB Frame HEADER (INDICATE FIRST PACKET BOUNDARY IN BB Frame) | GSE HEADER (INDICATE PACKET LENGTH OF THIS GSE) |
| CABLE RETRANSMISSION J.382 (GSE → TLV) | (GSE → TLV IS ONLY REPLACEMENT OF HEADER, SO THAT THERE IS NO SPECIAL ERROR PROCESSING FUNCTION) | | |

RECEIVING DEVICE AND METHOD, AND COMMUNICATING SYSTEM

TECHNICAL FIELD

The present disclosure relates to a receiving device and a method, and a communicating system, and especially relates to a receiving device and a method, a communicating system capable of receiving a packet which may not include an error without invalidating the same as much as possible.

BACKGROUND ART

In digital television broadcasting, video and audio are divided into packet units and multiplexed to be transmitted. As a classification of a packet, there is a fixed length packet and a variable length packet. An example of the variable length packet is a type length value (TLV) packet of advanced broadband digital broadcasting (advanced BS). Hereinafter, the variable length packet is simply referred to as a packet.

In multiplexed transmission, error correction coding is performed on a transmitting side, and decoding is performed on a signal sent as a multiplexed stream on a receiving side. In general, a unit of error correction coding/decoding (referred to as a block, slot and the like) and a unit of a packet does not coincide with each other, and the packet steps over a plurality blocks or a plurality of packets are present in one block.

In general, the packet includes a header and a data part. A length (packet length) of the packet may be known from a parameter indicating a data length stored in the header. On the receiving side, there is a case where information formatted to the packet unit is output from the data length and information indicating a boundary of the packet such as system information.

If a receiver fails in error correction decoding of a certain block in a transmission stream, all packets using even a little bit of a decoding result of the block are invalidated. In the packet to be invalidated, since the data length stored in the header of the packet might be erroneous, a series of packets are invalidated (refer to Patent Document 1).

CITATION LIST

Patent Document

Patent Document 1: Japanese Patent Application Laid-Open No. 2009-201117

SUMMARY OF THE INVENTION

Problems to be Solved by the Invention

As described above, due to the failure in decoding of a certain block, adjacent packets are invalidated irrespective of whether there is an error in the packet. As a result, "the packet which does not contain an error" which may be used essentially for decoding/playback or recording might be invalidated. Therefore, there is a need for a method that does not invalidate as much as possible packets that may not contain errors.

The present disclosure is achieved in view of such a situation, and it is possible to receive a packet which may not contain an error without invalidating the same as much as possible.

Solutions to Problems

A receiving device according to one aspect of the present technology is provided with an information analyzing unit which analyzes packet information regarding a packet from a transmitted multiplexed stream, a packet length indicating unit which defines a packet length, and a packet dividing unit which divides the multiplexed stream into packets by using at least one of the packet information analyzed by the information analyzing unit and the packet length indicating the packet length defined by the packet length indicating unit.

The packet dividing unit may divide the multiplexed stream into packets by using the packet length in the packet information analyzed by the information analyzing unit or the packet length indicating the packet length defined by the packet length indicating unit according to a comparison result between the packet length in the packet information analyzed by the information analyzing unit and a range of the packet length defined by the packet length indicating unit.

The packet dividing unit may divide the multiplexed stream into packets by using the packet length in the packet information in a case where it is determined that the packet length in the packet information analyzed by the information analyzing unit falls within the range of the packet length defined by the packet length indicating unit.

The packet dividing unit may divide the multiplexed stream into packets by using the packet length defined by the packet length indicating unit in a case where it is determined that the packet length in the packet information analyzed by the information analyzing unit is out of the range of the packet length defined by the packet length indicating unit.

In a case where the packet divided on the basis of the packet length defined by the packet length indicating unit is the packet having a non-standard short packet length, the packet dividing unit may adjust a divided position with an immediately preceding packet length or invalidate the packet having the short packet length.

The packet dividing unit may rewrite header information of an immediately preceding packet when dividing the packet.

The header information is a synchronous byte, type information, or a data length at the time of division.

The packet dividing unit may add additional information defined by a transmission protocol when dividing the packet.

The packet length indicating unit may define the packet length by using a result of learning the packet length from the packet length with which division processing is performed previously.

The packet length indicating unit may define a range of the packet length by using a result of learning the packet length from the packet length with which the division processing is performed previously.

The packet is a type length value (TLV) packet.

The packet information is at least one of transmission and multiplexing configuration control information (TMCC information), slot header information, and data length information.

The packet information is at least one of BB Frame header information and data length information.

The packet information is at least one of divided TLV packet header information and data length information.

In a receiving method according to one aspect of the present technology, a receiving device analyzes packet information regarding a packet from a transmitted multiplexed stream, defines a packet length, and divides the multiplexed stream into packets by using at least one of analyzed packet information and defined packet length.

A communicating system according to another aspect of the present technology is provided with a transmitting device provided with a transmitting unit which divides a signal into packets and transmits a multiplexed stream obtained by multiplexing the divided packets, an information analyzing unit which analyzes packet information regarding the packet from the multiplexed stream transmitted by the transmitting device, a packet length indicating unit which defines a packet length, and a packet dividing unit which divides the multiplexed stream into packets by using at least one of the packet information analyzed by the information analyzing unit and the packet length indicating the packet length defined by the packet length indicating unit.

In one aspect of the present technology, the packet information regarding the packet is analyzed from the transmitted multiplexed stream and the packet length is defined. Then, the multiplexed stream is divided into packets using at least one of the analyzed packet information and the defined packet length.

In another aspect of the present technology, the signal is divided into packets by the transmitting device, and the multiplexed stream in which the divided packets are multiplexed is transmitted. Also, the packet information regarding the packet is analyzed from the transmitted multiplexed stream by the receiving device, and the packet length is defined. Then, the multiplexed stream is divided into packets using at least one of the analyzed packet information and the defined packet length.

Effects of the Invention

According to the present technology, it is possible to receive a packet which may not contain an error without invalidating the same as much as possible.

Meanwhile, an effect described in this specification is merely an example; an effect of the present technology is not limited to that described in this specification and an additional effect may also be obtained.

BRIEF DESCRIPTION OF DRAWINGS

FIG. 37 is a view illustrating comparison between advanced BS broadcasting and cable retransmission.

MODE FOR CARRYING OUT THE INVENTION

Modes for carrying out the present disclosure (hereinafter, referred to as embodiments) are hereinafter described. Meanwhile, the description is given in the following order.

1. First Embodiment (Advanced Broadband Digital Broadcasting)
2. Second Embodiment (Cable Retransmission)
3. Third Embodiment (Personal Computer)

1. First Embodiment (Advanced Broadband Digital Broadcasting)

<Configuration Example of Communicating System of Present Technology>

Figure 1:
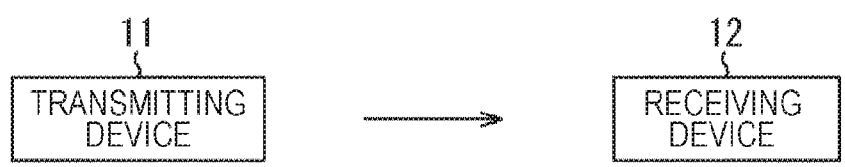
FIG. 1 is a view illustrating a configuration example of a communicating system to which the present technology is applied.

FIG. 1 is a view illustrating a configuration example of a communicating system to which the present technology is applied.

In the example in FIG. 1i, a communicating system 1 includes a transmitting device 11 which divides a broadcast signal of advanced broadband digital broadcasting (hereinafter also referred to as advanced BS) into packet units and multiplexes them to transmit, and a receiving device 12 which receives the broadcast signal divided into the packet units to be multiplexed.

In the communicating system 1, a type length value (TLV) packet being a variable length packet is used. Meanwhile, in this embodiment, the variable length packet is hereinafter sometimes referred to as a packet appropriately.

<Configuration Example of Receiving Device>

Figure 2:
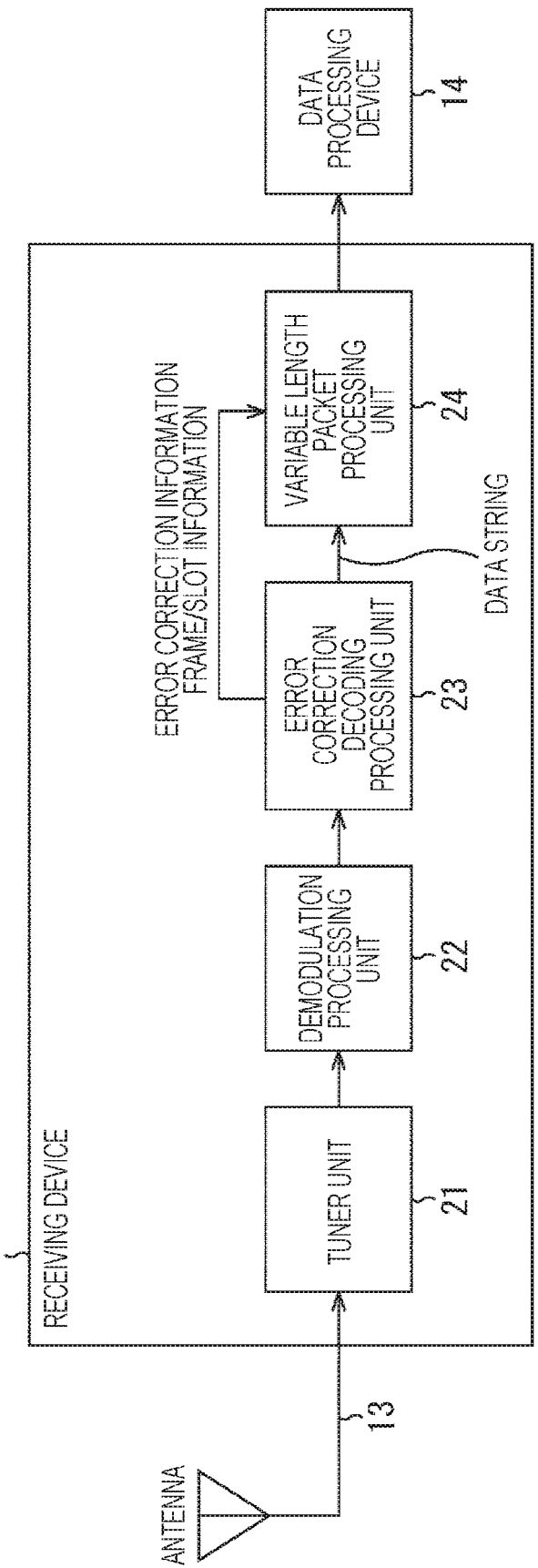
FIG. 2 is a block diagram illustrating a configuration example of a receiving device.

FIG. 2 is a block diagram illustrating a configuration example of the receiving device in FIG. 1.

The receiving device 12 also is a signal processing device which receives the broadcast signal received by an antenna 13 and performs predetermined signal processing thereon. Data on which the signal processing is performed by the receiving device 12 is output to a data processing device 14 including a decoder and the like at a subsequent stage.

The receiving device 12 includes a tuner unit 21, a demodulation processing unit 22, an error correction decoding processing unit 23, and a variable length packet processing unit 24.

The tuner unit 21 performs RF processing on the broadcast signal received by the antenna 13 and outputs the signal after the RF processing to the demodulation processing unit 22. The demodulation processing unit 22 performs demodulation processing on the signal after the RF processing and outputs digital signals 0 and 1 obtained as a result of demodulation to the error correction decoding processing unit 23.

The error correction decoding processing unit 23 performs error correction decoding processing such as LDPC, BCH, Reed Solomon, and convolutional code, and outputs a data string after the error correction decoding processing to the variable length packet processing unit 24. At that time, the error correction decoding processing unit 23 also supplies error correction information and frame/slot information to the variable length packet processing unit 24.

The variable length packet processing unit 24 performs variable length packet division processing according to whether the error correction of a slot M and a slot M−1 of the data string after the error correction processing is successful or failed by using the error correction information and the frame/slot information from the error correction decoding processing unit 23. The variable length packet processing unit 24 outputs a packet string obtained by packet division to the data processing device 14 at the subsequent stage.

<Configuration Example of Variable Length Packet Processing Unit>

Figure 3:
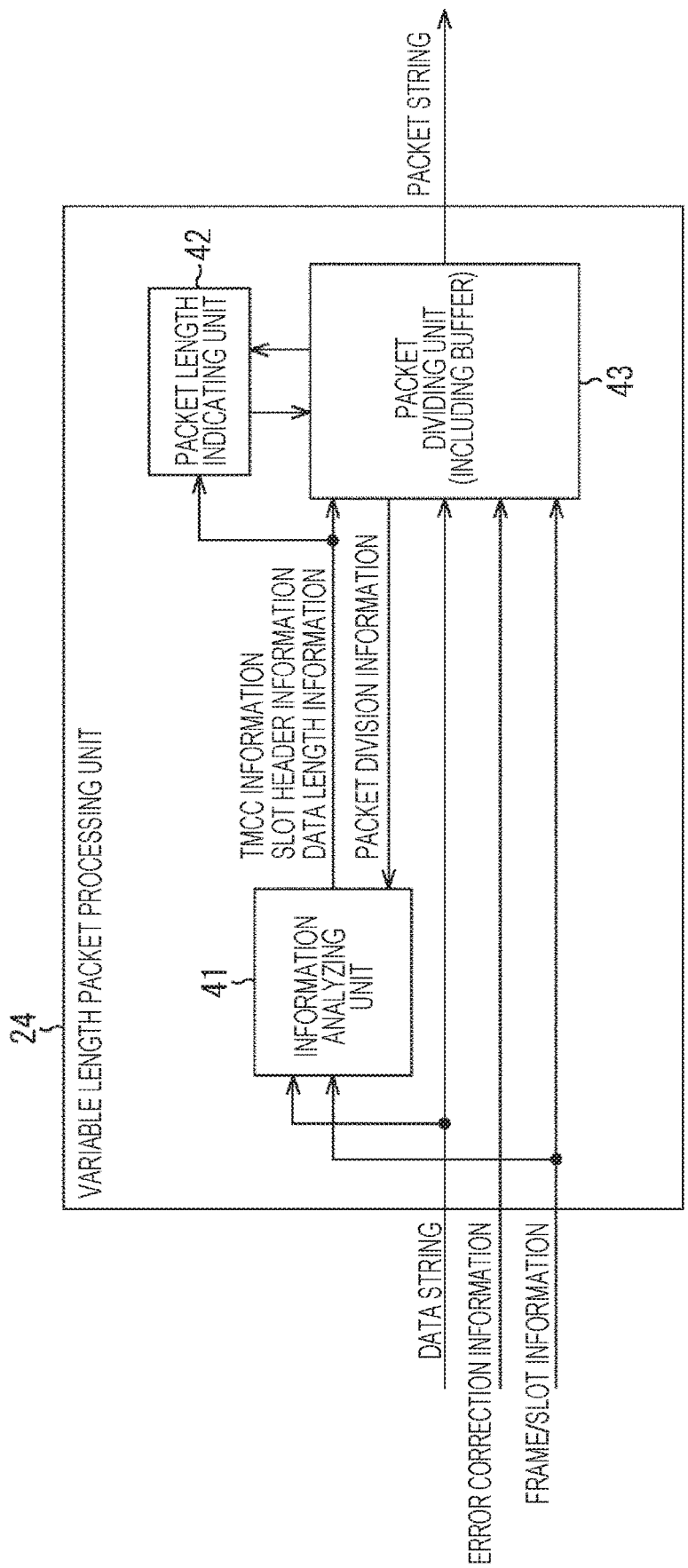
FIG. 3 is a block diagram illustrating a configuration example of a variable length packet processing unit.

FIG. 3 is a block diagram illustrating a configuration example of the variable length packet processing unit.

The variable length packet processing unit 24 includes an information analyzing unit 41, a packet length indicating unit 42, and a packet dividing unit 43.

The data string and the frame/slot information from the error correction decoding processing unit 23 are input to the information analyzing unit 41 and the packet dividing unit 43. The error correction information from the error correction decoding processing unit 23 is input to the packet dividing unit 43.

The information analyzing unit 41 analyzes the data string and the frame/slot information and supplies transmission and multiplexing configuration control information (TMCC information), slot header information, and data length information to the packet length indicating unit 42 and the packet dividing unit 43.

The packet length indicating unit 42 defines a packet length in advance and indicates the defined packet length to the packet dividing unit 43. Meanwhile, the packet length may be defined to be, for example, a packet size upper limit provided in terms of standard and operation. In addition, as is described later in detail, for example, the packet length may also be updated on the basis of a result of learning the packet length with which the division processing is performed.

The packet dividing unit 43 performs the packet division on the basis of at least one of the information (TMCC information, slot header information, and data length information) from the information analyzing unit 41 and the packet length indicated by the packet length indicating unit 42. As for the packet length, especially, the packet dividing unit 43 performs the packet division on the basis of the packet length obtained by the information (TMCC information, slot header information, and data length information) from the information analyzing unit 41 or the packet length indicated by the packet length indicating unit 42. The packet string obtained by division by the packet dividing unit 43 is output to the data processing device 14 at the subsequent stage. The packet dividing unit 43 outputs packet division information being information of a position of division to the information analyzing unit 41. Meanwhile, the packet dividing unit 43 includes a buffer.

<Configuration Example of TLV Packet>

Next, a method of detecting TLV packet boundary information is described with reference to FIG. 4.

Figure 4:
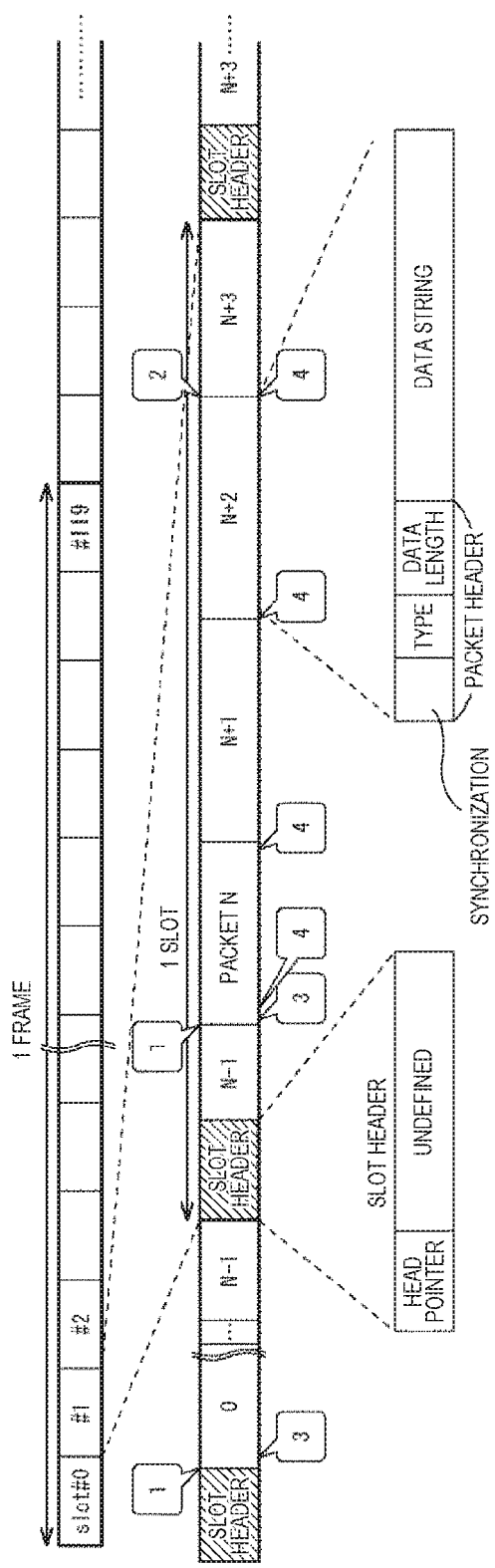
FIG. 4 is a view illustrating a method of detecting TLV packet boundary information.

In the example in FIG. 4, a TLV packet configuration is illustrated. A TLV packet includes a plurality of slots. The slot includes a slot header including a head pointer and an undefined part, and a plurality of packets. The packet includes a packet header including synchronization, type, and data length, and a data string.

The TLV packet boundary information configured in this manner may be detected from four types of information indicated by 1 to 4 in FIG. 4.

1 indicates a head pointer by the TMCC.
2 indicates a final pointer by the TMCC.
3 indicates a head pointer by the slot header.
4 indicates packet length cumulative information of the packet header.

Herein, 1 and 2 may be detected from the TMCC, and 3 and 4 may be detected from the data string.

Meanwhile, robustness of information becomes higher in descending order of 1 to 4. In addition to the data string included in the packet, for example, a head/final boundary position pointer in each error correction block (slot) is stored in system transmission information (TMCC) that is more robust than the data string.

<Processing Example of Receiving Device>

Next, a reception processing of the receiving device 12 is described with reference to a flowchart in FIG. 5.

At step S11, the tuner unit 21 performs the RF processing on the broadcast signal received by the antenna 13 and outputs the signal after the RF processing to the demodulation processing unit 22. At step S12, the demodulation processing unit 22 performs the demodulation processing on the signal after the RF processing and outputs digital signals 0 and 1 obtained as a result of the demodulation to the error correction decoding processing unit 23.

At step S13, the error correction decoding processing unit 23 performs the error correction decoding processing such as LDPC, BCH, Reed Solomon, and convolutional code and outputs the data string after the error correction decoding processing to the variable length packet processing unit 24.

At step S14, the variable length packet processing unit 24 performs the variable length packet division processing according to whether the error correction of the slot M and the slot M−1 of the data string after the error correction processing is successful or failed by using the error correction information and the frame/slot information from the error correction decoding processing unit 23. Meanwhile, the variable length packet division processing is described later in detail with reference to FIG. 6 and the like.

At step S15, the variable length packet processing unit 24 outputs the packet string obtained by the packet division to the data processing device 14 at the subsequent stage.

Figure 5:
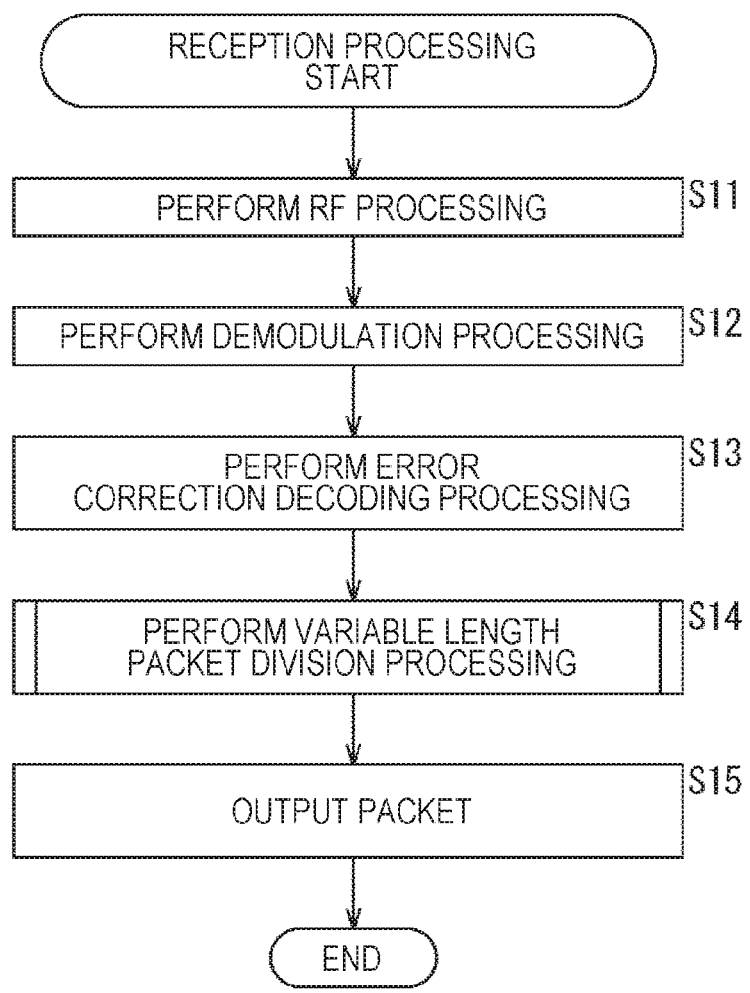
FIG. 5 is a flowchart illustrating reception processing of the receiving device.
Figure 6:
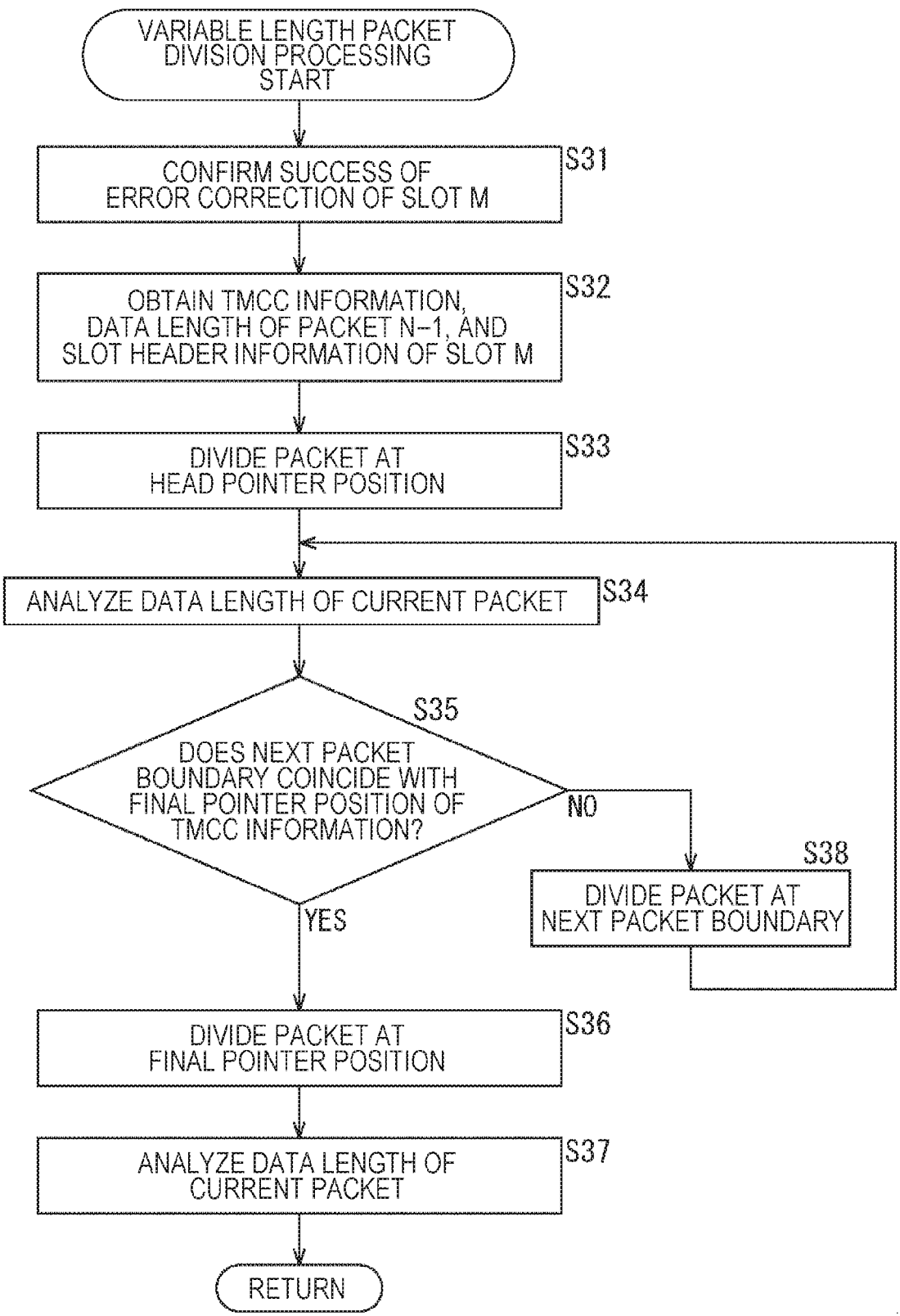
FIG. 6 is a flowchart illustrating variable length packet division processing at step S14 in FIG. 5.

Next, the variable length packet division processing at step S14 in FIG. 5 is described with reference to a flowchart in FIG. 6. Meanwhile, the example in FIG. 6 is the example in which the packet division is performed when decoding of both the slots M−1 and M is successful. A number in a balloon in FIG. 7 corresponds to a step number in FIG. 6, and FIG. 6 is illustrated with reference to FIG. 7 appropriately.

Figure 7:
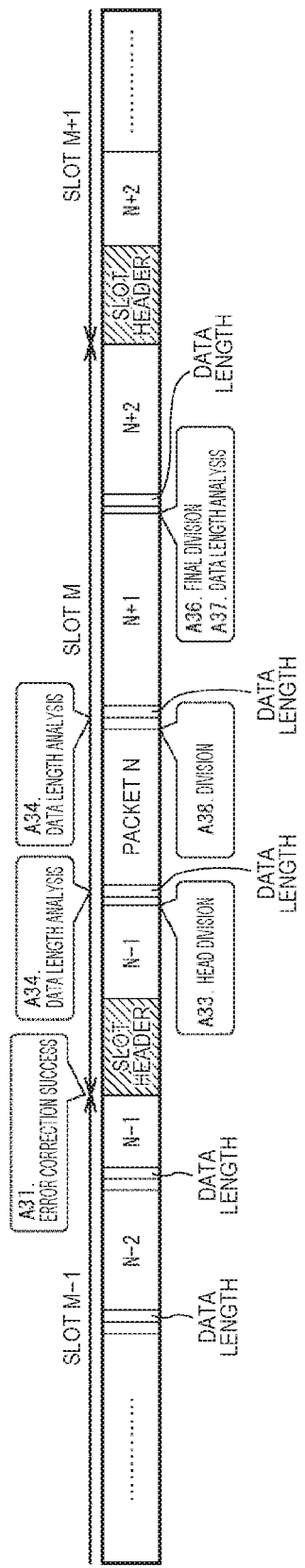
FIG. 7 is a view illustrating the variable length packet division processing in FIG. 6.

At step S31, the information analyzing unit 41 confirms whether the error correction of the slot M is successful (A31 in FIG. 7). At step S32, the packet dividing unit 43 obtains (at least one of) the TMCC information, the data length of the packet N−1, and the slot header information of the slot M from the information analyzing unit 41.

Since a head pointer position may be obtained from any information obtained at step S32, the packet dividing unit 43 divides the packet at the head pointer position at step S33 (A33 in FIG. 7). At that time, the packet dividing unit 43 supplies the packet division information to the information analyzing unit 41.

At step S34, the information analyzing unit 41 analyzes the data length of a current packet on the basis of the packet division information from the packet dividing unit 43 (A34 in FIG. 7). At step S35, the information analyzing unit 41 determines whether a next packet boundary indicated by the data length of the current packet coincides with a final pointer position of the TMCC information.

At step S35, in a case where it is determined that the next packet boundary coincides with the final pointer position of the TMCC information, the procedure shifts to step S36. At step S36, the packet dividing unit 43 divides the packet at the final pointer position obtained from the information analyzing unit 41 (A36 in FIG. 7). At that time, since the packet dividing unit 43 supplies the packet division information to the information analyzing unit 41, at step S37, the information analyzing unit 41 analyze the data length of the current packet by the packet division information from the packet dividing unit 43 and thereafter finishes the variable length packet division processing.

On the other hand, in a case where it is determined that the next packet boundary does not coincide with the final pointer position of the TMCC information at step S35, the procedure shifts to step S38. At step S38, the packet dividing unit 43 divides the packet at the next packet boundary obtained from the information analyzing unit 41 (A38 in FIG. 7). Thereafter, the procedure returns to step S34 and subsequent processes are repeated.

When the decoding of both the slots M−1 and M is successful, the packet division is performed as described above. The example in FIG. 6 is the variable length packet division processing when the decoding of both the slot M−1 and slot M is successful.

On the other hand, due to failure in decoding of a certain block, an adjacent packet is conventionally invalidated regardless of presence or absence of an error of the packet. As a result, "a packet without an error contained" which may originally be used for decoding/playback or recording is invalidated in some cases. Therefore, a suggestion not to invalidate the packets not containing errors as much as possible is required.

In addition, the packet to be sent without invalidating the packet as much as possible might exceed a packet maximum size defined by the standard and the like because there is an error in the data itself indicating the data length of the packet, for example. Alternatively, in a case where a plurality of adjacent continuous packets is invalidated due to failure in decoding a certain block, the invalidated packet (null packet) might exceed the packet maximum size defined by the standard or the like. Alternatively, in a case of operation where an invalidated packet length is limited, there is a risk of exceeding that limit.

As described above, the packet exceeding the packet maximum size defined by the standard and the like might cause an overflow of the buffer of the data processing device 14 such as a decoder which receives a receiver output. Therefore, a method of always controlling the packet size of the receiver output to be equal to or smaller than a value defined by the standard and the like is necessary.

Therefore, in the present technology, as for the packet including the data of the block the decoding of which is failed, the packet is divided with a fixed packet length set to be the packet size upper limit.

Figure 8:
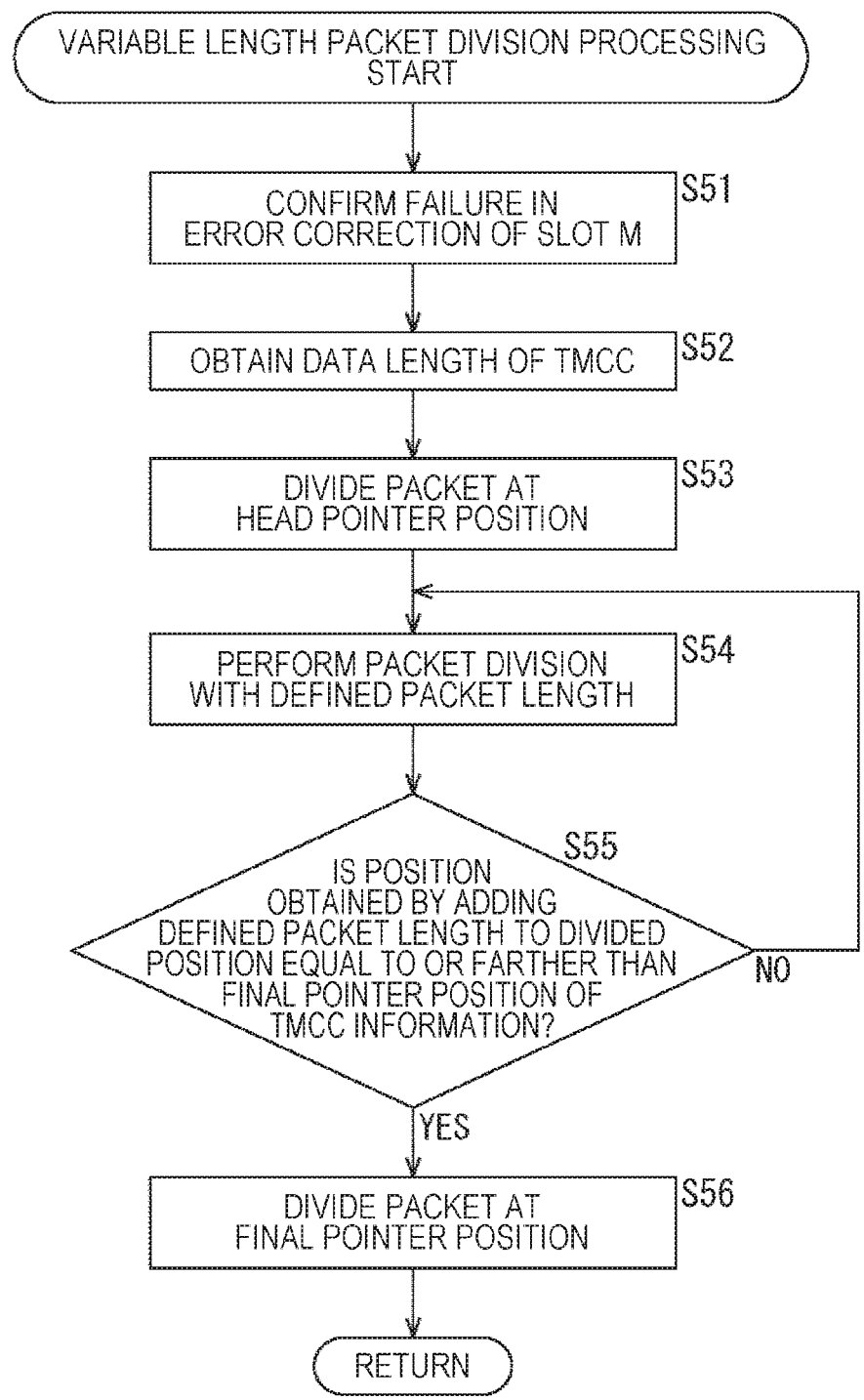
FIG. 8 is a flowchart illustrating another example of the variable length packet division processing at step S14 in FIG. 5.

Next, an example of performing the packet division when the decoding of both the slots M−1 and M is failed is described with reference to a flowchart in FIG. 8. FIG. 8 is the flowchart illustrating the variable length packet division processing at step S14 in FIG. 5. Meanwhile, a number in a balloon in FIG. 9 corresponds to a step number in FIG. 8, and FIG. 8 is illustrated with reference to FIG. 9 appropriately.

Figure 9:
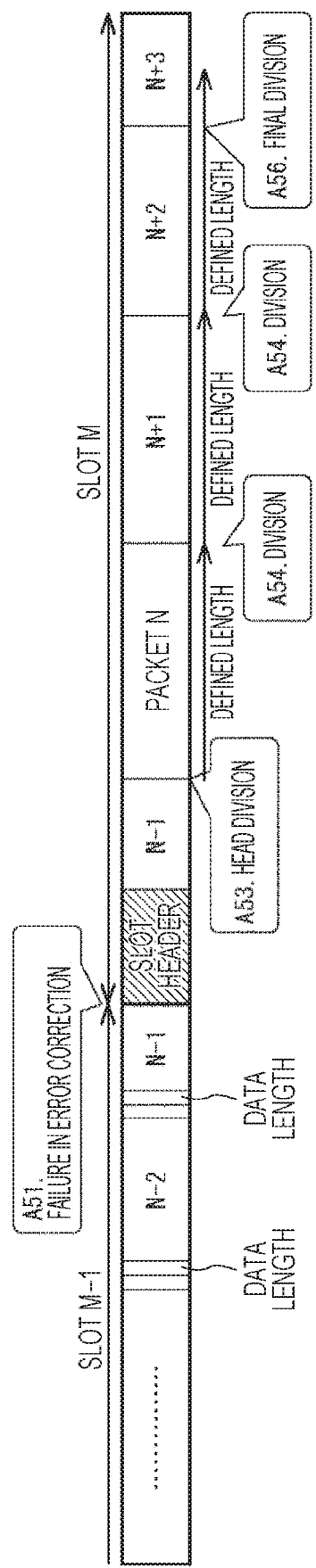
FIG. 9 is a view illustrating the variable length packet division processing in FIG. 8.

At step S51, the information analyzing unit 41 confirms failure in error correction of the slot M (A51 in FIG. 9). At step S52, the packet dividing unit 43 obtains the data length of the TMCC information from the information analyzing unit 41.

Since the head pointer position may be obtained from the data length obtained at step S52, the packet dividing unit 43 performs the packet division at the head pointer position at step S53 (A53 in FIG. 9).

The packet length indicating unit 42 defines the packet length in advance. Meanwhile, the defined packet length may also be updated by learning to be described later or the like. At step S54, the packet dividing unit 43 divides the packet with the packet length defined by the packet length indicating unit 42 (A54 in FIG. 9). At that time, overwriting packet division to be described later is performed.

At step S55, the packet dividing unit 43 determines whether a position obtained by adding the defined packet length to the divided position is equal to or farther than the final pointer position of the TMCC information from the information analyzing unit 41. In a case where it is determined at step S55 that the position obtained by adding the defined packet length to the divided position is not equal to or farther than the final pointer position of the TMCC information from the information analyzing unit 41, that is, this is before the final pointer position, the procedure returns to step S54 and the subsequent processes are repeated.

In a case where it is determined at step S55 that the position obtained by adding the defined packet length to the divided position is equal to or farther than the final pointer position of the TMCC information from the information analyzing unit 41, the procedure shifts to step S56. At step S56, the packet dividing unit 43 divides the packet at the final pointer position (A56 in FIG. 9) to finish the variable length packet division processing.

When the decoding of both the slots M−1 and M is failed, the packet division is performed using the packet length defined as described above.

As described above, by dividing the packet with an inherent length (packet length) expected to be actually transmitted, it is possible to send the packet which may not contain the error without invalidating the same as much as possible. At that time, since the inherent length is set to the packet size upper limit, the packet size of the receiver output may always be controlled to be equal to or smaller than the value determined by the standard or the like.

Figure 10:
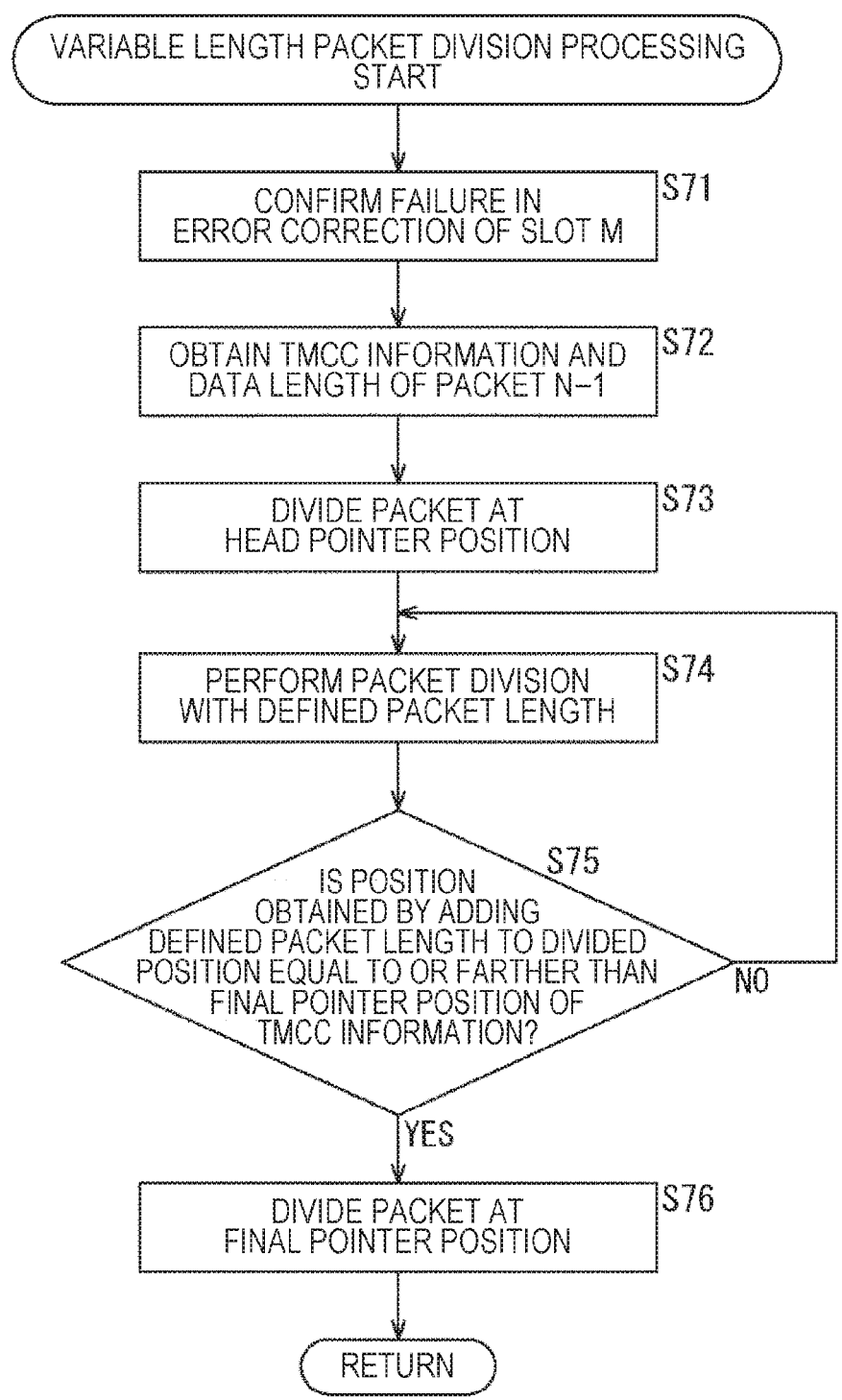
FIG. 10 is a flowchart illustrating the variable length packet division processing at step S14 in FIG. 5.

Next, an example of performing the packet division when the decoding of the slot M−1 is successful and the decoding of the slot M is failed is described with reference to a flowchart in FIG. 10. FIG. 10 is the flowchart illustrating the variable length packet division processing at step S14 in FIG. 5. Meanwhile, a number in a balloon in FIG. 11 corresponds to a step number in FIG. 10, and FIG. 10 is illustrated with reference to FIG. 11 appropriately.

Figure 11:
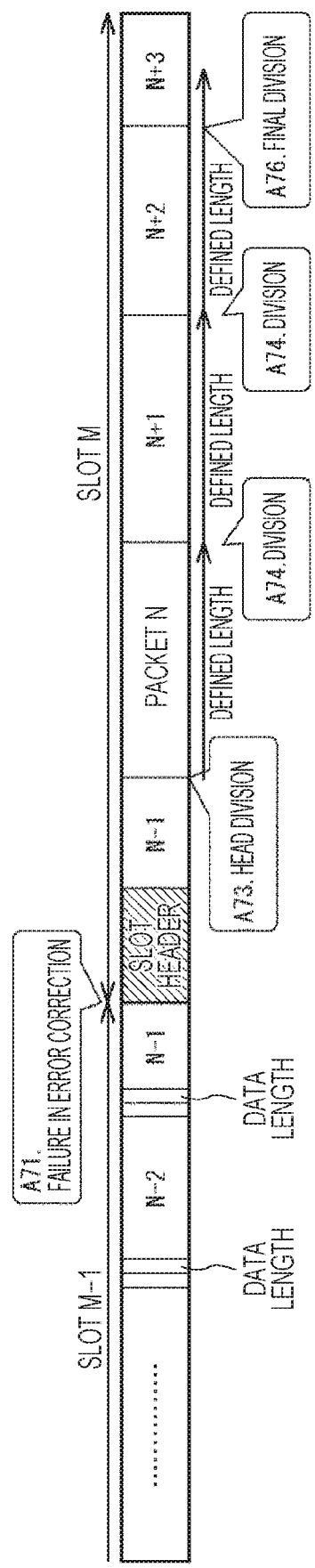
FIG. 11 is a view illustrating the variable length packet division processing in FIG. 10.

At step S71, the information analyzing unit 41 confirms the failure in error correction of the slot M (A71 in FIG. 11). At step S72, the packet dividing unit 43 obtains at least one of the TMCC information and the data length of the packet N−1 from the information analyzing unit 41.

Since the head pointer position may be obtained from the data length obtained at step S72, the packet dividing unit 43 divides the packet at the head pointer position at step S73 (A73 in FIG. 11).

The packet length indicating unit 42 defines the packet length in advance. At step S74, the packet dividing unit 43 performs the packet division with the packet length defined by the packet length indicating unit 42 (A74 in FIG. 11). At that time, overwriting packet division to be described later is performed.

At step S75, the packet dividing unit 43 determines whether a position obtained by adding the defined packet length to the divided position is equal to or farther than the final pointer position of the TMCC information from the information analyzing unit 41. In a case where it is determined at step S75 that the position obtained by adding the defined packet length to the divided position is not equal to or farther than the final pointer position of the TMCC information from the information analyzing unit 41, that is, this is before the final pointer position, the procedure returns to step S74, and the subsequent processes are repeated.

In a case where it is determined at step S75 that the position obtained by adding the defined packet length to the divided position is equal to or farther than the final pointer position of the TMCC information from the information analyzing unit 41, the procedure shifts to step S76. At step S76, the packet dividing unit 43 divides the packet at the final pointer position (A76 in FIG. 11) to finish the variable length packet division processing.

When the decoding of the slot M−1 is successful and the decoding of the slot M is failed, the packet division is performed by using the defined packet length as described above. In this example also, it is possible to obtain an effect similar to that in the example in FIG. 8 by dividing the packet with the inherent length (packet length) expected to be actually transmitted.

Figure 12:
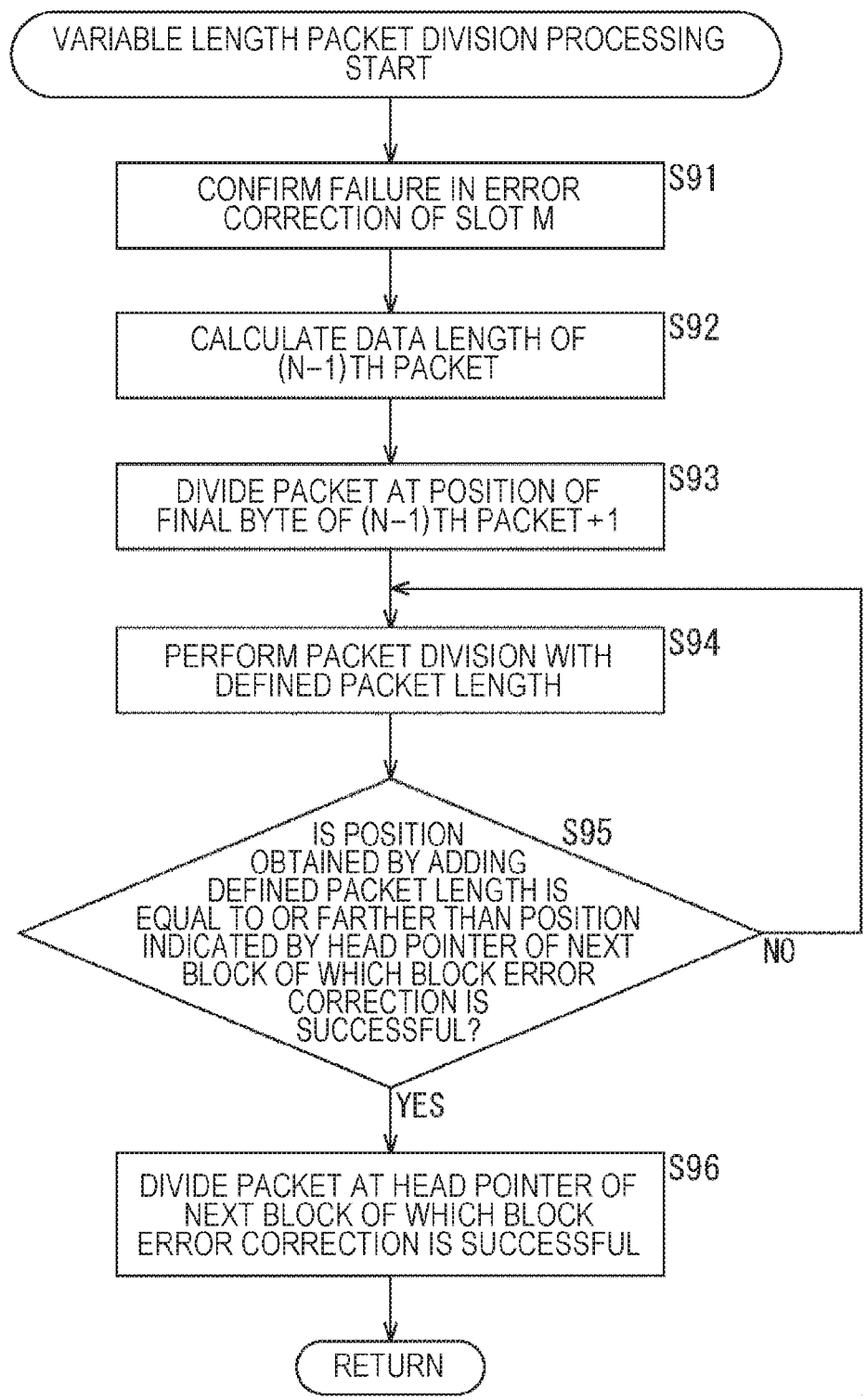
FIG. 12 is a flowchart illustrating the variable length packet division processing at step S14 in FIG. 5.

Next, an example in which the packet division is performed when the decoding of the slot M−1 is successful and the decoding of the slot M is failed as with FIG. 10, but the pointer information by the TMCC cannot be used is described with reference to FIG. 12. FIG. 12 is a flowchart illustrating the variable length packet division processing at step S14 in FIG. 5. Meanwhile, a number in a balloon in FIG. 13 corresponds to a step number in FIG. 12, and FIG. 12 is illustrated with reference to FIG. 13 appropriately.

Figure 13:
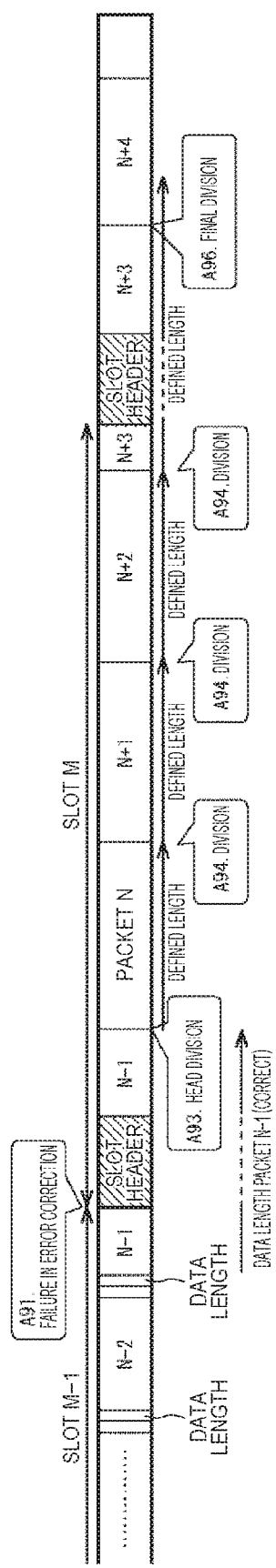
FIG. 13 is a view illustrating the variable length packet division processing in FIG. 12.

At step S91, the information analyzing unit 41 confirms the failure in error correction of the slot M (A91 in FIG. 13). At step S92, the packet dividing unit 43 obtains the data length of the packet N−1 from the information analyzing unit 41.

By calculating the data length obtained at step S92, the packet dividing unit 43 divides the packet at a position of a final byte of an (N−1)th packet +1 at step S93, (A93 in FIG. 13).

The packet length indicating unit 42 defines the packet length by learning and the like to be described later. At step S94, the packet dividing unit 43 performs the packet division with the packet length defined by the packet length indicating unit 42 (A94 in FIG. 13). At that time, overwriting packet division to be described later is performed.

At step S95, the packet dividing unit 43 determines whether a position obtained by adding the defined packet length to the divided position is equal to or farther than a position indicated by the head pointer of a next block of which block error correction is successful. In a case where it is determined at step S95 that the position obtained by adding the defined packet length to the divided position is not equal to or farther than position indicated by the head pointer of the next block the block error correction of which is successful, that is, this is before the final pointer position, the procedure returns to step S94 and the subsequent processes are repeated.

At step S95, in a case where it is determined that the position obtained by adding the defined packet length to the divided position is equal to or farther than the position indicated by the head pointer of the next block the block error correction of which is successful, the procedure shifts to step S96. At step S96, the packet dividing unit 43 divides the packet at the position indicated by the head pointer of the next block the block error correction of which is successful (in an example of A96 in FIG. 13, a head of an (N+4)th packet) and finishes the variable length packet division processing.

When the decoding of the slot M−1 is successful and the decoding of the slot M is failed, and the pointer information by the TMCC cannot be used, the packet division is performed as described above. In this example also, it is possible to obtain an effect similar to that in the example in FIG. 8 by dividing the packet with the inherent length (packet length) expected to be actually transmitted.

Meanwhile, it is described above an example of dividing the packet with a fixed packet length set to the packet size upper limit as for the packet including the data of the block the decoding of which is failed. In contrast, an example in which the data length stored in the header is analyzed as for the packet including the data of the block the decoding of which is failed, and if the analyzed data length falls within a defined range of data lengths, probability of the packet may be confirmed and the packet division is performed is next described with reference to FIG. 14.

Figure 14:
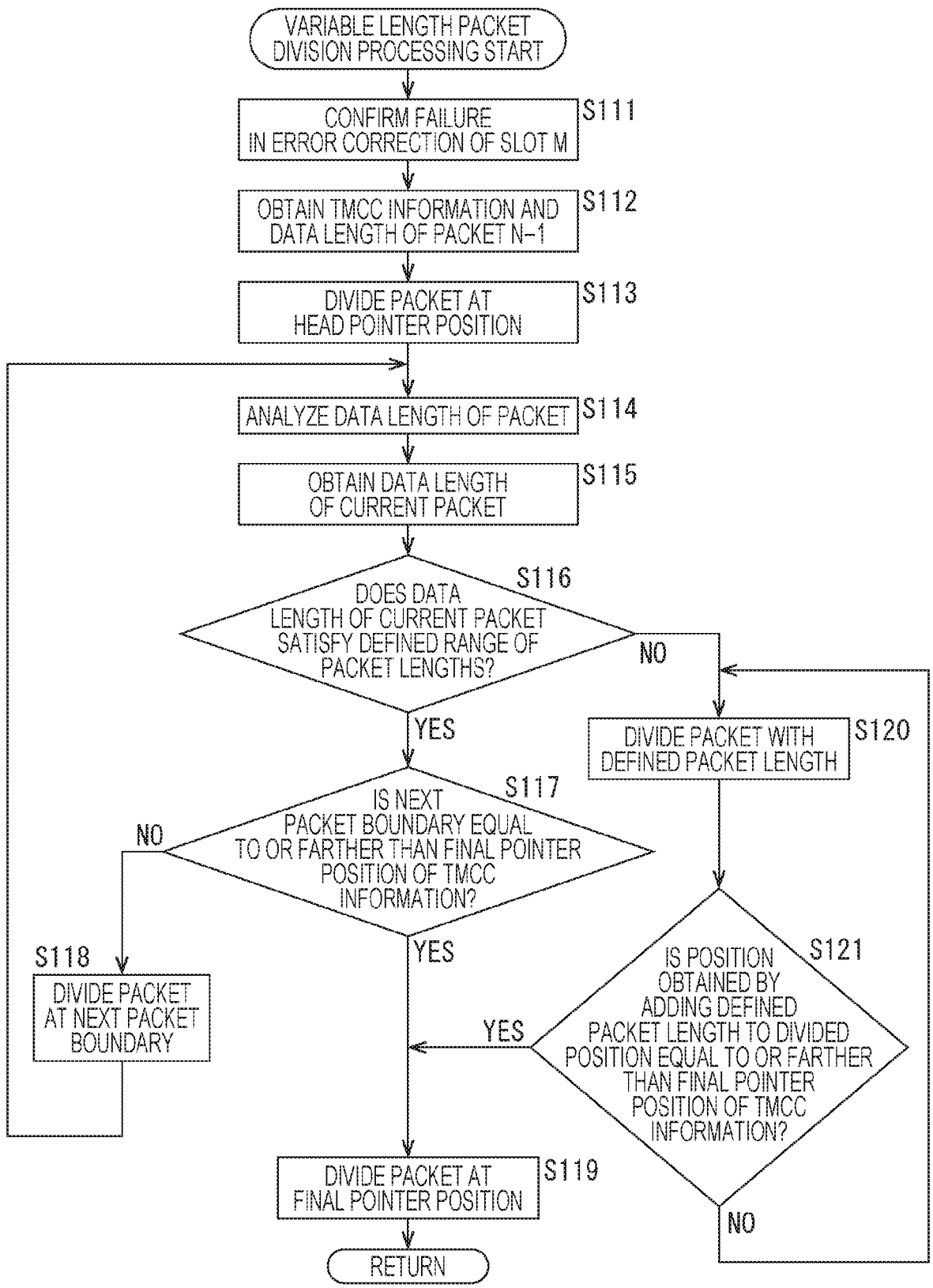
FIG. 14 is a flowchart illustrating still another example of the variable length packet division processing at step S14 in FIG. 5.

FIG. 14 is a flowchart illustrating the variable length packet division processing at step S14 in FIG. 5. Meanwhile, the example in FIG. 14 is the example in which the packet division is performed when the decoding of the slots M-1 is successful and the decoding of the slot M is failed. A number in a balloon in FIG. 15 corresponds to a step number in FIG. 14, and FIG. 14 is illustrated with reference to FIG. 15 appropriately.

Figure 15:
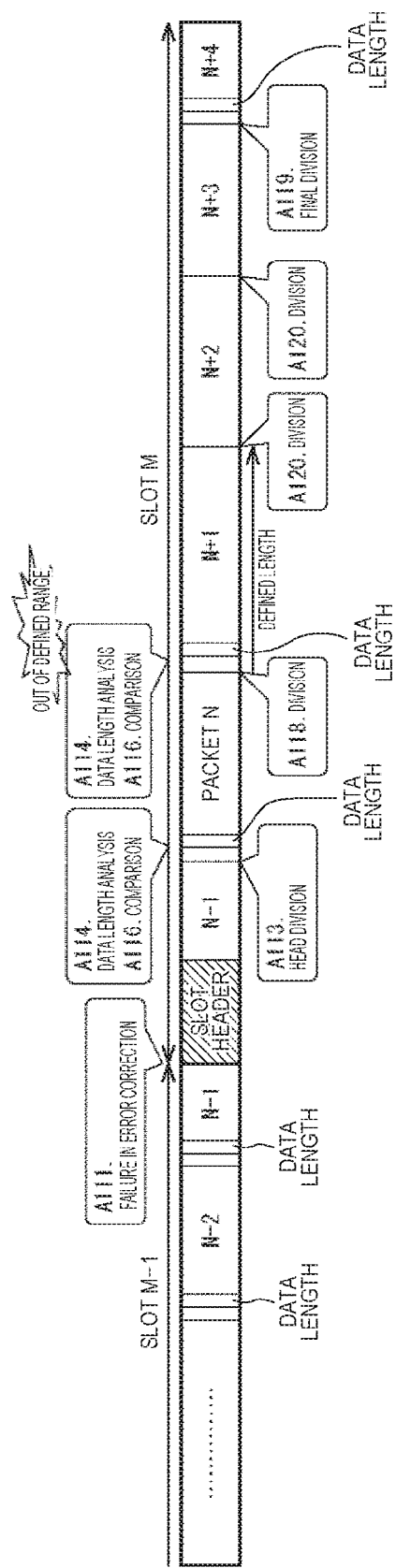
FIG. 15 is a view illustrating the variable length packet division processing in FIG. 14.

At step S111, the information analyzing unit 41 confirms the failure in error correction of the slot M (A111 in FIG. 15). At step S112, the packet dividing unit 43 obtains at least one of the TMCC information and the data length of the packet N-1 from the information analyzing unit 41.

Since the head pointer position may be obtained from the data length obtained at step S112, the packet dividing unit 43 divides the packet at the head pointer position at step S113 (A113 in FIG. 15). At that time, the packet dividing unit 43 supplies the packet division information to the information analyzing unit 41.

At step S114, the information analyzing unit 41 analyzes the data length of the current packet on the basis of the packet division information from the packet dividing unit 43 (A114 in FIG. 15). At step S115, the packet length indicating unit 42 obtains the data length of the current packet from the information analyzing unit 41.

The packet length indicating unit 42 defines a plurality of packet lengths (or a range of the packet lengths). At step S116, the packet length indicating unit 42 determines whether the obtained data length of the current packet satisfies the defined range of the packet lengths (A116 in FIG. 15).

In a case where it is determined at step S116 that the data length of the current packet satisfies the defined range of the packet lengths, the procedure shifts to step S117 assuming that the packet is probable. At step S117, the packet dividing unit 43 determines whether the next packet boundary indicated by the data length of the current packet is equal to or farther than the final pointer position of the TMCC information from the information analyzing unit 41.

At step S117, in a case where it is determined that the next packet boundary indicated by the data length of the current packet is not equal to or farther than the final pointer position of the TMCC information from the information analyzing unit 41, the procedure shifts to step S118. At step S118, the packet dividing unit 43 next divides the packet at the packet boundary. Thereafter, the procedure returns to step S114 and the subsequent processes are repeated.

At step S117, in a case where it is determined that the next packet boundary indicated by the data length of the current packet is equal to or farther than the final pointer position of the TMCC information from the information analyzing unit 41, the procedure shifts to step S119. At step 119, the packet dividing unit 43 divides the packet at the final pointer position and finishes the variable length packet division processing.

On the other hand, in a case where it is determined at step S116 that the data length of the current packet does not satisfy the defined range of the packet lengths, the procedure shifts to step S120 assuming that the packet is not probable. At step S120, the packet dividing unit 43 performs the packet division with the packet length defined by the packet length indicating unit 42 (A120 in FIG. 15). At that time, overwriting packet division to be described later is performed.

At step S121, the packet dividing unit 43 determines whether the position obtained by adding the defined packet length to the divided position is equal to or farther than the final pointer position of the TMCC information from the information analyzing unit 41. In a case where it is determined at step S121 that the position obtained by adding the defined packet length to the divided position is not equal to or farther than the final pointer position of the TMCC information from the information analyzing unit 41, that is, this is before the final pointer position, the procedure returns to step S120 and the subsequent processes are repeated.

In a case where it is determined at step S121 that the position obtained by adding the defined packet length to the divided position is equal to or farther than the final pointer position of the TMCC information from the information analyzing unit 41, the procedure returns to step S119. At step S119, the packet dividing unit 43 divides the packet at the final pointer position (A119 in FIG. 15) and finishes the variable length packet division processing.

As described above, when the decoding of the slot M-1 is successful and the decoding of the slot M is failed, as for the packet including the data of the block the decoding of which is failed, if the data length stored in the header falls within the defined range of the data lengths, the data length of the current packet is used and the packet division is performed. As a result, the packet including the block the decoding of which is failed is also divided, so that it possible to send the packet which may not contain the error without invalidating the same as much as possible.

On the other hand, in a case where the data length stored in the header does not fall within the defined range of the data lengths, the packet division is performed with the defined packet length assuming that the packet is not probable. As a result, as in the example in FIG. 8, by dividing the packet with the inherent length (packet length) expected to be actually transmitted, it is possible to send the packet which may not contain the error without invalidating the same as much as possible. At that time, since the inherent length is set to the packet size upper limit, the packet size of the receiver output may always be controlled to be equal to or smaller than the value determined by the standard or the like.

Figure 16:
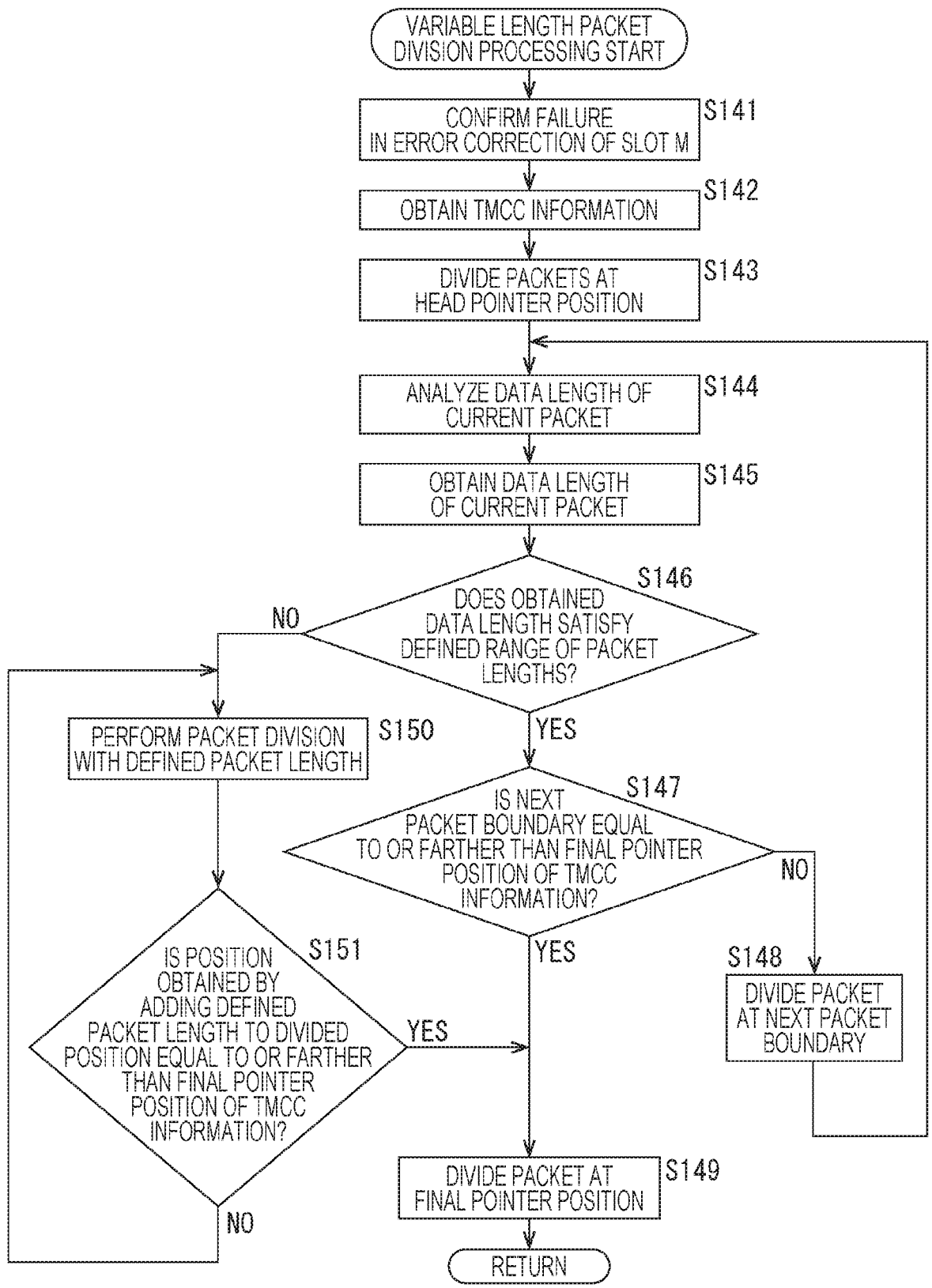
FIG. 16 is a flowchart illustrating still another example of the variable length packet division processing at step S14 in FIG. 5.

Next, the variable length packet division processing at step S14 in FIG. 5 is described with reference to a flowchart in FIG. 16. Meanwhile, the example in FIG. 16 is the example of performing the packet division by using the data length of the current packet if the data length stored in the header falls within the defined range of the data lengths as for the packet including the data of the block the decoding of which is failed when the decoding of both the slots M-1 and M is failed. A number in a balloon in FIG. 17 corresponds to a step number in FIG. 16, and FIG. 16 is illustrated with reference to FIG. 17 appropriately.

Figure 17:
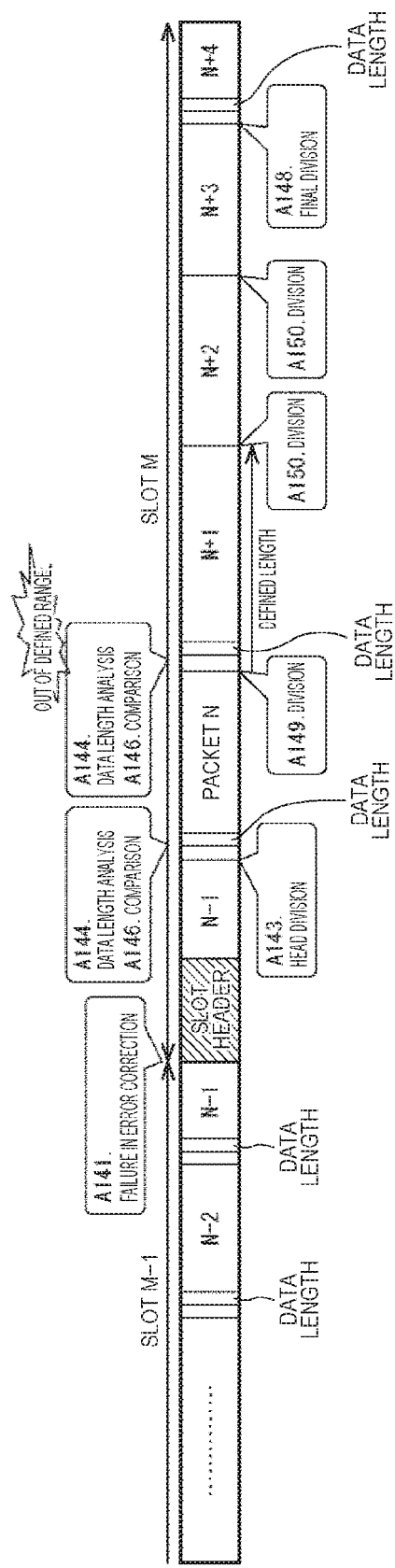
FIG. 17 is a view illustrating the variable length packet division processing in FIG. 16.

At step S141, the information analyzing unit 41 confirms the failure in error correction of the slot M (A141 in FIG. 17). At step S142, the packet dividing unit 43 obtains the data length of the TMCC information from the information analyzing unit 41.

Since the head pointer position may be obtained from the data length obtained at step S142, the packet dividing unit 43 divides the packet at the head pointer position at step S143 (A143 in FIG. 17).

At step S144, the information analyzing unit 41 analyzes the data length of the current packet on the basis of the packet division information from the packet dividing unit 43 (A144 in FIG. 17). At step S145, the packet length indicating unit 42 obtains the data length of the current packet from the information analyzing unit 41.

The packet length indicating unit 42 defines a plurality of packet lengths (or a range of the packet lengths). At step S146, the packet length indicating unit 42 determines whether the obtained data length of the current packet satisfies the defined range of the packet lengths (A146 in FIG. 17).

In a case where it is determined at step S146 that the data length of the current packet satisfies the defined range of the packet lengths, the procedure shifts to step S147. At step S147, the packet dividing unit 43 determines whether the next packet boundary indicated by the data length of the current packet is equal to or farther than the final pointer position of the TMCC information from the information analyzing unit 41.

At step S147, in a case where it is determined that the next packet boundary indicated by the data length of the current packet is not equal to or farther than the final pointer position of the TMCC information from the information analyzing unit 41, the procedure shifts to step S148. At step S148, the packet dividing unit 43 next divides the packet at the packet boundary. Thereafter, the procedure returns to step S144 and the subsequent processes are repeated.

At step S147, in a case where it is determined that the next packet boundary indicated by the data length of the current packet is equal to or farther than the final pointer position of the TMCC information from the information analyzing unit 41, the procedure shifts to step S149. At step 149, the packet dividing unit 43 divides the packet at the final pointer position and finishes the variable length packet division processing.

On the other hand, in a case where it is determined at step S146 that the data length of the current packet does not satisfy the defined range of the packet lengths, the procedure shifts to step S150. At step S150, the packet dividing unit 43 performs the packet division with the packet length defined by the packet length indicating unit 42 (A150 in FIG. 17). At that time, overwriting packet division to be described later is performed.

At step S151, the packet dividing unit 43 determines whether the position obtained by adding the defined packet length to the divided position is equal to or farther than the final pointer position of the TMCC information from the information analyzing unit 41. In a case where it is determined at step S151 that the position obtained by adding the defined packet length to the divided position is not equal to or farther than the final pointer position of the TMCC information from the information analyzing unit 41, that is, this is before the final pointer position, the procedure returns to step S150 and the subsequent processes are repeated.

In a case where it is determined at step S151 that the position obtained by adding the defined packet length to the divided position is equal to or farther than the final pointer position of the TMCC information from the information analyzing unit 41, the procedure shifts to step S149. At step S149, the packet dividing unit 43 divides the packet at the final pointer position (A149 in FIG. 17) and finishes the variable length packet division processing.

As described above, when the decoding of the slots M−1 and M is failed, as for the packet including the data of the block the decoding of which is failed also, if the data length stored in the header falls within the defined range of the data lengths, the data length of the current packet is used and the packet division is performed. On the other hand, in a case where the data length stored in the header does not fall within the defined range of the data length, it is determined that the packet is not correct, and the packet division is performed with the defined packet length. As a result, the effect similar to that in the example in FIG. 14 is obtained.

<Overwriting Packet Division>

Meanwhile, processing when overwriting division is performed in a case where the packet division is performed with the packet length defined by the packet length indicating unit 42 (for example, step S54 in FIG. 8, step S74 in FIG. 10, step S94 in FIG. 12, step S120 in FIG. 14, or step S150 in FIG. 16) in the description above is described.

In the above-described processing, in a case of performing the packet division using the data length information of the block the decoding of which might be failed, or the packet division using the packet length obtained from the packet length indicating unit 42, the packet header information included in the data might be wrong.

Figure 18:
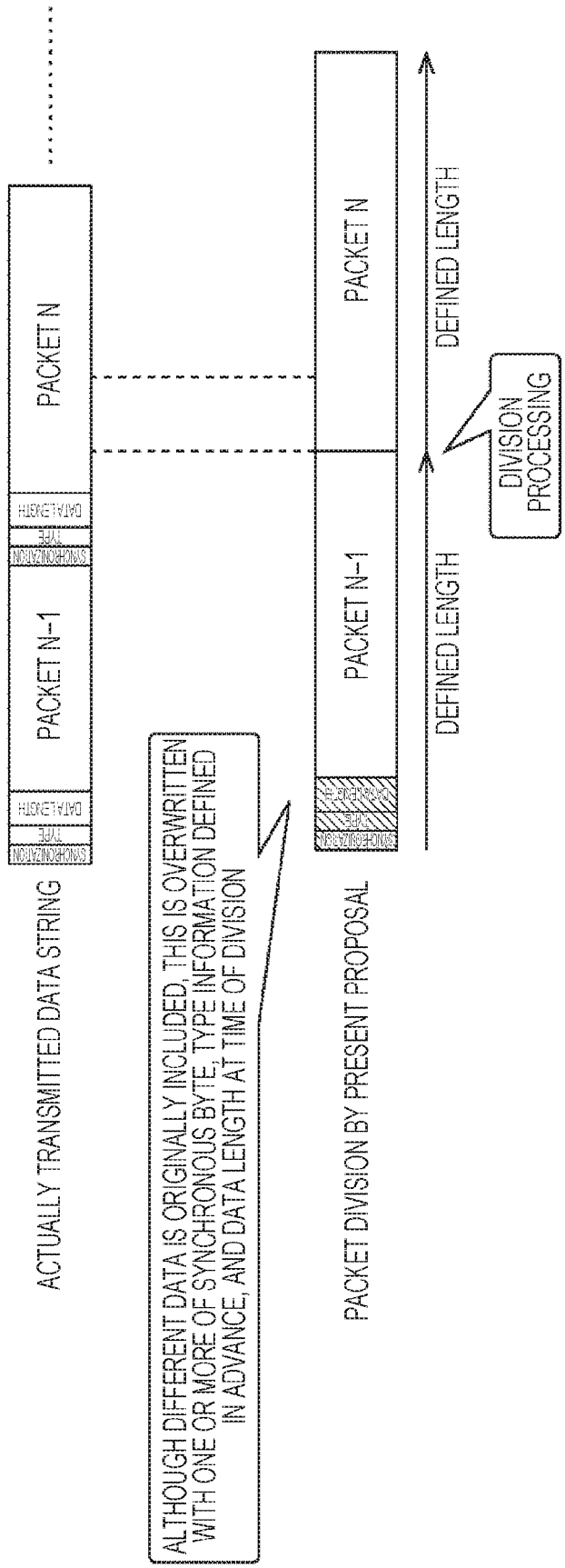
FIG. 18 is a view illustrating overwriting division processing.

In this case, as illustrated in FIG. 18, a data string of a site newly corresponding to the TLV packet header may be (overwritten) corrected so as to correspond to the TLV packet header such that the packet has a format of the TLV packet.

In an example in FIG. 18, the data string by the packet division according to the present proposal is illustrated under the actually transmitted data string. In the present proposal, the header of the packet N−1 may include different data originally, but this is overwritten with one or more of a synchronous byte, predetermined type information, and a data length at the time of division. The same applies to the header of the packet N.

Also, another example of a case where the packet division using the data length information of the block the decoding of which might be failed or the packet division using the packet length obtained from the packet length indicating unit 42 is performed in the above-described processing is described with reference to FIGS. 19 and 20.

In the above-described case, when the number of bytes from the divided position to the divided position by the final pointer (assumed to be a pseudo packet N) is equal to or smaller than a minimum value (four bytes in the case of TLV) of the packet length defined by the standard, processing of preventing output of this pseudo packet is performed.

Figure 19:
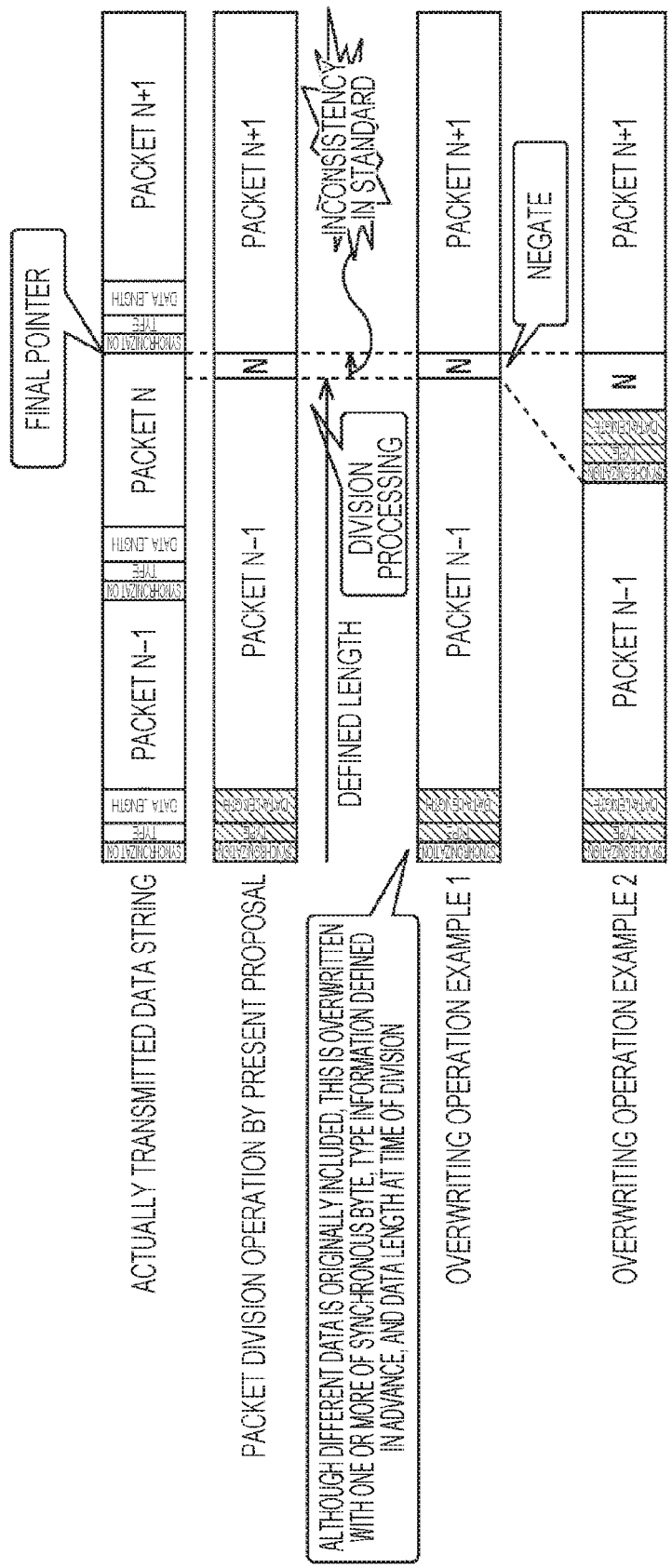
FIG. 19 is a view illustrating the overwriting division processing.

In the example in FIG. 19, the data string by the packet division according to the present proposal is illustrated under the actually transmitted data string. At the time of the packet division according to the present proposal, as described above with reference to FIG. 18, the header of the packet N−1 is overwritten with one or more of the synchronous byte, the predetermined type information, and the data length at the time of division.

Next, as for the pseudo packet N, the size of which is equal to or smaller than four bytes and there is standard mismatch, so that a valid flag of the data is negated as an overwriting operation example 1.

Alternatively, as an overwriting operation example 2, the length of the packet N−1 is adjusted, the header is added to the pseudo packet N, and the length is satisfied such that both the packet N−1 and the pseudo packet N have a size matching to the standard. Meanwhile, in this case, a data string of a site newly corresponding to the TLV packet header may be corrected so as to correspond to the TLV packet header such that a format of the TLV packet is newly obtained such that the packet has the format of the TLV packet.

Figure 20:
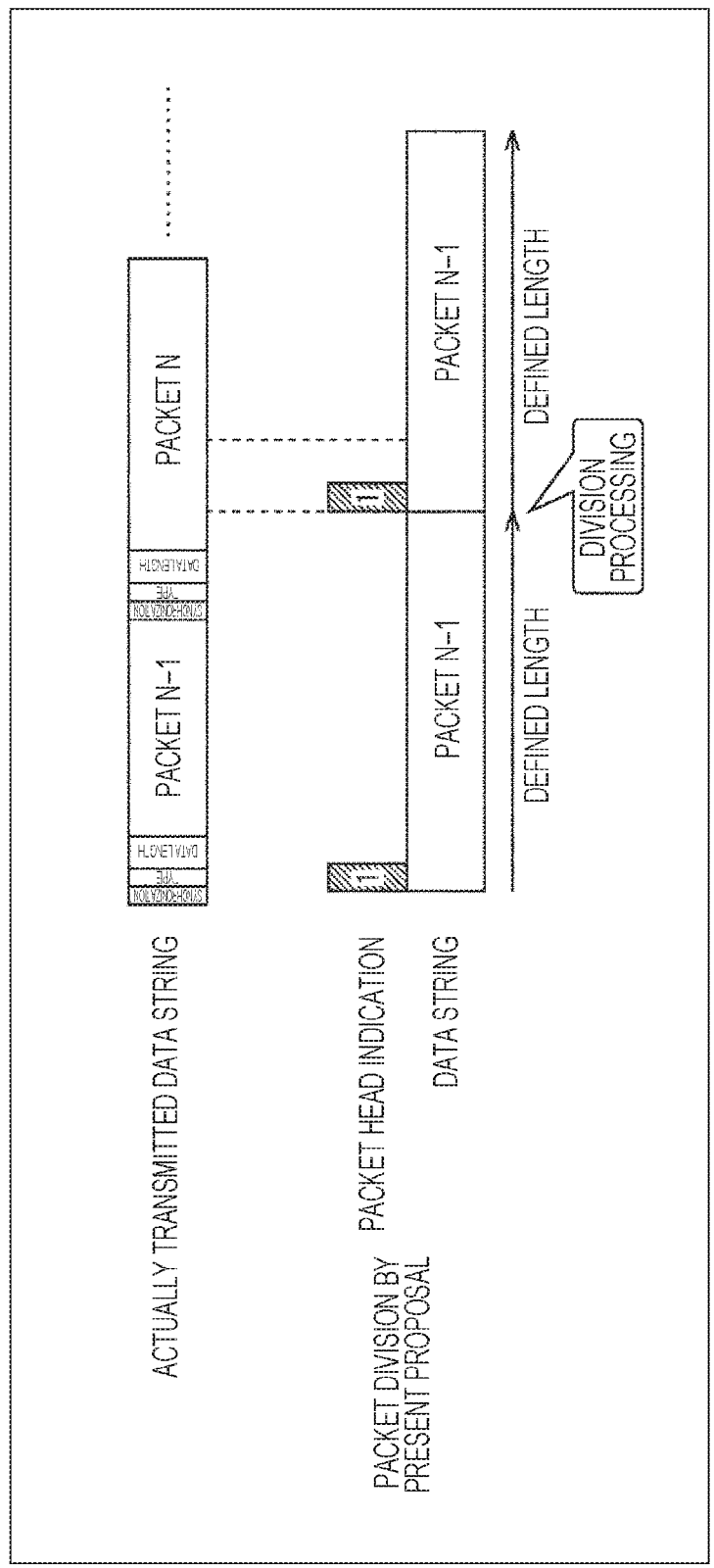
FIG. 20 is a view illustrating the overwriting division processing.

Furthermore, in the above-described case, it is possible to add an indicator indicating the packet head as illustrated in FIG. 20 to the data string with a predetermined protocol.

In the example of FIG. 20, the indicator indicating the packet head is added to the head of the packet N−1 on which the division processing is performed with the defined length, and further, the indicator indicating the packet head is added to the head of the packet N on which the division processing is performed with the defined length.

Meanwhile, this operation may be performed together with the operation 1 or 2 described above with reference to FIG. 19. That is, operation of preventing the divided packet from having the minimum value (four bytes in the case of TLV) or smaller of the packet length determined by the standard (operation 1 or 2 in FIG. 19) is performed, and the indicator indicating the packet head is added to the data string by the predetermined protocol. This makes it unnecessary to modify contents of the packet.

<Setting Method 1 of Defined Value of Packet Length>

Meanwhile, as described above, in a case where the variable length packet is used, a general broadcasting company might perform the packet division with the maximum packet length defined by the standard or the fixed packet length close thereto in order to maximize a transmission rate and transmit the same.

In contrast, the fixed packet length cannot be known in advance, and this might be changed depending on sending setting and the like of the broadcasting company.

Figure 21:
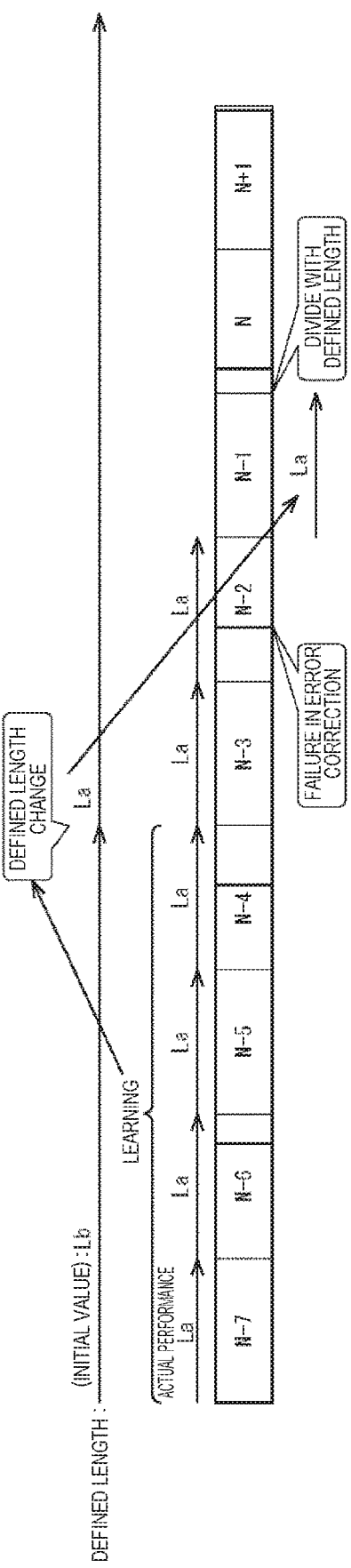
FIG. 21 is a view illustrating a method of setting a defined value of a packet length.

Therefore, in a case of performing the packet division with the packet length defined by the packet length indicating unit 42 (for example, step S54 in FIG. 8, step S74 in FIG. 10, step S94 in FIG. 12, step S120 in FIG. 14, or step S150 in FIG. 16), as illustrated in FIG. 21, the packet length indicating unit 42 monitors a packet length L of the packet divided in a slot error correction of which is successful in a case where an initial value of the defined value is Lb, thereby learning the defined value. That is, for example, when the same value La continues in the packets as actual performance, the value (La) is made a new defined value. Then, the packet length indicating unit 42 indicates the packet length with a new defined value.

Meanwhile, the learned value La may be individually held according to the type of packet (NTP packet, compressed packet, uncompressed packet and the like).

<Setting Method 2 of Defined Value of Packet Length>

Also, as described above, in a case where the variable length packet is used, the general broadcasting company might perform the packet division using the maximum packet length defined by the standard or a range of the packet lengths close thereto in order to maximize the transmission rate and transmit the same.

On the other hand, the packet length range (or sent packet length) cannot be known in advance, and this might be changed depending on the sending setting and the like of the broadcasting company.

Therefore, in a case where the range of the packet lengths is used (for example, step S116 in FIG. 14 or step S146 in FIG. 16), the packet length indicating unit 42 monitors the packet length L of the packet divided in the slot the error correction of which is successful, thereby leaning a range Ra which the packet length may take, for example. Then, the packet length indicating unit 42 uses the learned Ra to determine correctness of the packet.

Figure 22:
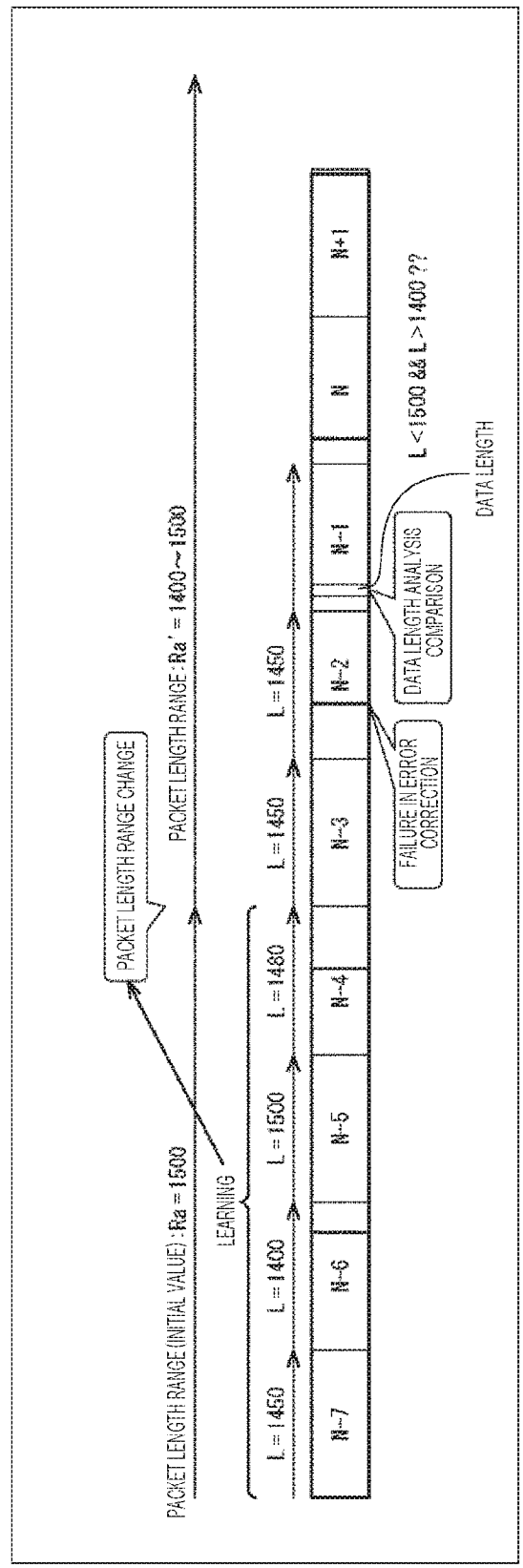
FIG. 22 is a view illustrating another method of setting the defined value of the packet length.

In an example in FIG. 22, the initial value of the packet length range is Ra=4 to 1500; however, the packet length indicating unit 42 monitors the packet lengths (L=1450, L=1400, L=1500, and L=1480) of the packets divided in the slot the error correction of which is successful, thereby learning that Ra'=1400 to 1500. Then, the packet length indicating unit 42 determines the probability of the packet by performing the data length analysis and comparison (1400<L and L<1500).

As described above, according to the present technology, as for the packet including the data of the block the decoding of which is failed, the packet is divided with the fixed packet length.

As a result, by dividing the packet with the inherent length expected to be actually transmitted, it is possible to send the packet that may not contain an error without invalidating the same as much as possible.

In addition, by setting the inherent length to the upper limit of the packet size, the packet size of the receiver output may always be controlled to be equal to or smaller than the value determined by the standard or the like.

Also, according to the present technology, as for the packet including the data of the block the decoding of which is failed, the data length stored in the header is analyzed, and if the analyzed data length falls within a separately set range of the data lengths, the packet division is performed assuming that the probability of the packet may be confirmed.

As a result, the packet including the block the decoding of which is failed is also divided, so that it possible to send the packet which may not contain the error without invalidating the same as much as possible.

Furthermore, according to the present technology, in a case where the analyzed data length takes a value outside the set range, the packet may be divided with the packet length obtained by dividing with the fixed packet length on the basis of the next byte of the final byte of the final packet the packet division of which is normally performed.

As a result, as for the packet considered to have the error in the data length, by dividing the packet with the inherent length expected to be transmitted, it is possible to send the packet which may not contain the error without invalidating the same as much as possible. Also, by setting the inherent length to the upper limit of the packet size, the packet size of the receiver output may always be controlled to be equal to or smaller than the value determined by the standard or the like.

2. Second Embodiment (Cable Retransmission)

<Configuration Example of Communicating System of Present Technology>

Figure 23:
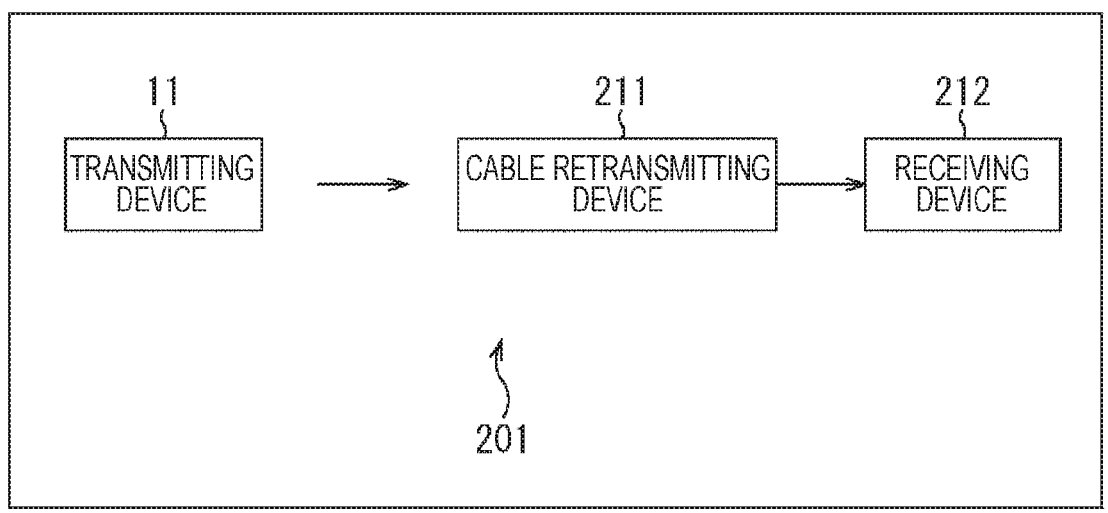
FIG. 23 is a view illustrating a configuration example of a cable retransmitting system to which the present technology is applied.

FIG. 23 is a view illustrating a configuration example of a cable retransmitting system as a communicating system to which the present technology is applied.

In the example in FIG. 23, a cable retransmitting system 201 includes a transmitting device 11 which divides a broadcast signal of advanced broadband digital broadcasting into packet units and multiplexing them to transmit, a cable retransmitting device 211 which receives the broadcast signal divided into the packet units to be multiplexed, performs NIT conversion and TLV multiplexing, and modulates by a cable method to retransmit, and a receiving device 212 which receives the signal modulated by the cable method.

In the cable retransmitting system 201, for example, when a TLV packet being a variable length packet transmitted by the transmitting device 11 is demodulated and obtained, cable modulation for making the same a signal of a cable method (that is, a divided TLV packet or a BB Frame) is performed.

Meanwhile, at the time of demodulation, it is also possible to output as the signal of the cable method as with the case of TS, but when demodulating by the receiving device 212 in FIG. 23, the original TLV packet is taken out from the cable method to be output.

<Configuration Example of Cable Retransmitting Device and Receiving Device>

Figure 24:
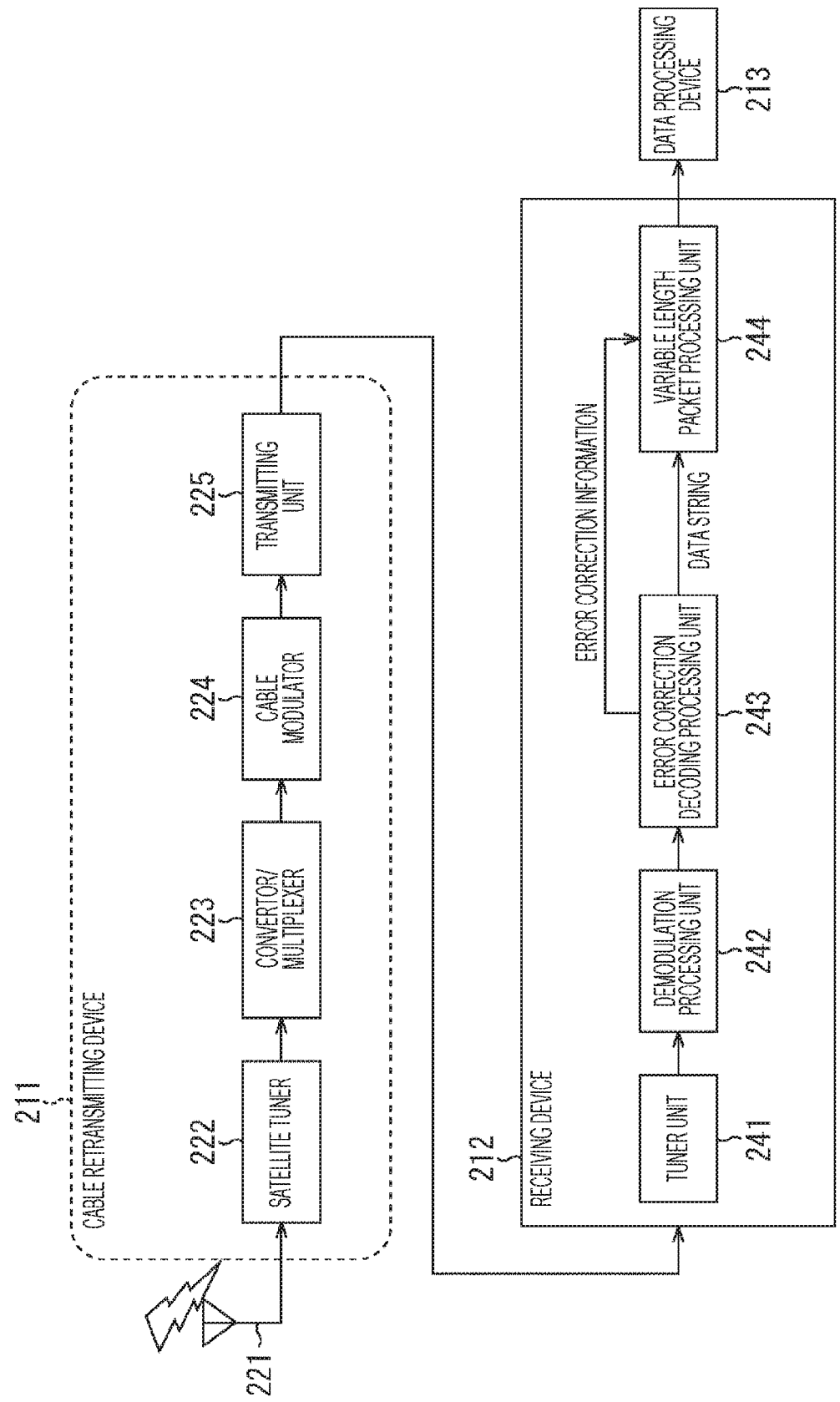
FIG. 24 is a block diagram illustrating a configuration example of the receiving device.

FIG. 24 is a block diagram illustrating a configuration example of the cable retransmitting device and the receiving device in FIG. 23.

In the example in FIG. 24, a data processing device 213 including a decoder at a subsequent stage and the like is configured at a subsequent stage of the receiving device 212, and data subjected to signal processing by the receiving device 212 is output to the data processing device 213.

The cable retransmitting device 211 includes an antenna 221, a satellite tuner 222, a converter/multiplexer 223, a cable modulator 224, and a transmitting unit 225.

The satellite tuner 222 performs RF processing on a broadcast signal of satellite broadcasting and the like, for example, received by the antenna 221, and outputs the signal after the RF processing to the converter/multiplexer 223. The converter/multiplexer 223 performs NIT conversion, TS/TLV multiplexing and the like and outputs to the cable modulator 224.

The cable modulator 224 modulates again by the cable method (such as ISDB-C or J.382) and outputs the signal modulated to the cable method (that is, the divided TLV packet in the case of ISDB-C, or the BB Frame in the case of J.382) to the transmitting unit 225. The transmitting unit 225 transmits the signal modulated to the cable method to the receiving device 212.

The receiving device 212 includes a tuner unit 241, a demodulation processing unit 242, an error correction decoding processing unit 243, and a variable length packet processing unit 244.

The tuner unit 241 performs the RF processing on the signal modulated to the cable method from the cable retransmitting device 211, and outputs the signal after the RF processing to the demodulation processing unit 242. The demodulation processing unit 242 performs demodulation processing on the signal after the RF processing and outputs digital signals 0 and 1 as a result of the demodulation to the error correction decoding processing unit 243.

The error correction decoding processing unit 243 performs error correction decoding processing such as LDPC, BCH, Reed Solomon, and convolutional code, and outputs a data string after the error correction decoding processing to the variable length packet processing unit 244. At that time, the error correction decoding processing unit 243 also supplies error correction information to the variable length packet processing unit 244.

The variable length packet processing unit 244 performs variable length packet division processing according to whether error correction of a unit of processing (BB Frame or divided TLV packet) M of the data string after the error correction processing is successful or failed by using the error correction information from the error correction decoding processing unit 243. The variable length packet processing unit 244 outputs a packet string obtained by packet division to the data processing device 213 at a subsequent stage.

<Configuration Example of Variable Length Packet Processing Unit>

Figure 25:
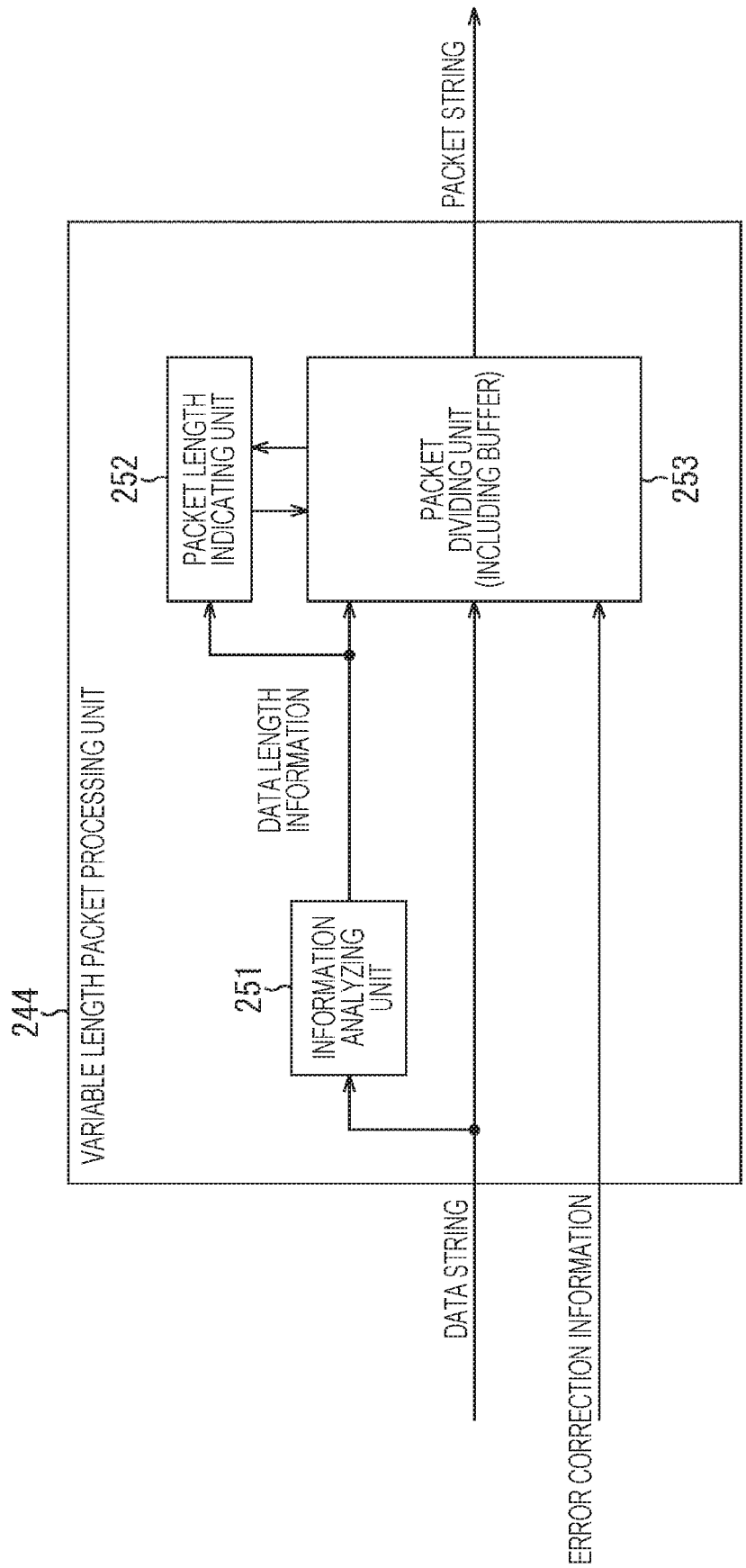
FIG. 25 is a block diagram illustrating a configuration example of a variable length packet processing unit.

FIG. 25 is a block diagram illustrating a configuration example of the variable length packet processing unit.

The variable length packet processing unit 244 includes an information analyzing unit 251, a packet length indicating unit 252, and a packet dividing unit 253.

The data string from the error correction decoding processing unit 243 is input to the information analyzing unit 251 and the packet dividing unit 253. The error correction information from the error correction decoding processing unit 243 is input to the packet dividing unit 253.

The information analyzing unit 251 analyzes the data string and supplies data length information to the packet length indicating unit 252 and the packet dividing unit 253.

The packet length indicating unit 252 defines a packet length in advance, and indicates the defined packet length to the packet dividing unit 253. Meanwhile, the packet length may be defined to be, for example, a packet size upper limit provided in terms of standard and operation. Also, as described above with reference to FIGS. 21 and 22, for example, the packet length may be updated on the basis of a result of learning the packet length obtained by division processing.

The packet dividing unit 253 performs the packet division on the basis of at least one of the information (data length information) from the information analyzing unit 251 and the packet length indicated by the packet length indicating unit 252. Regarding the packet length, especially, the packet dividing unit 253 performs the packet division on the basis of the packet length obtained from the information (data length information) from the information analyzing unit 251 or the packet length indicated by the packet length indicating unit 252. The packet string obtained by the division by the packet dividing unit 253 is output to the data processing device 213 at a subsequent stage. The packet dividing unit 253 outputs packet division information being information of a position of division to the information analyzing unit 251. Meanwhile, the packet dividing unit 253 includes a buffer.

<BB Frame Configuration Example>

Next, a method of detecting TLV packet boundary information in the BB Frame is described with reference to FIG. 26. In a case of J.382, the TLV packet is subjected to the cable modulation by the cable retransmitting device 211 to be modulated to a GSE packet, and further, the GSE packet is modulated to the BB Frame to be transmitted.

Figure 26:
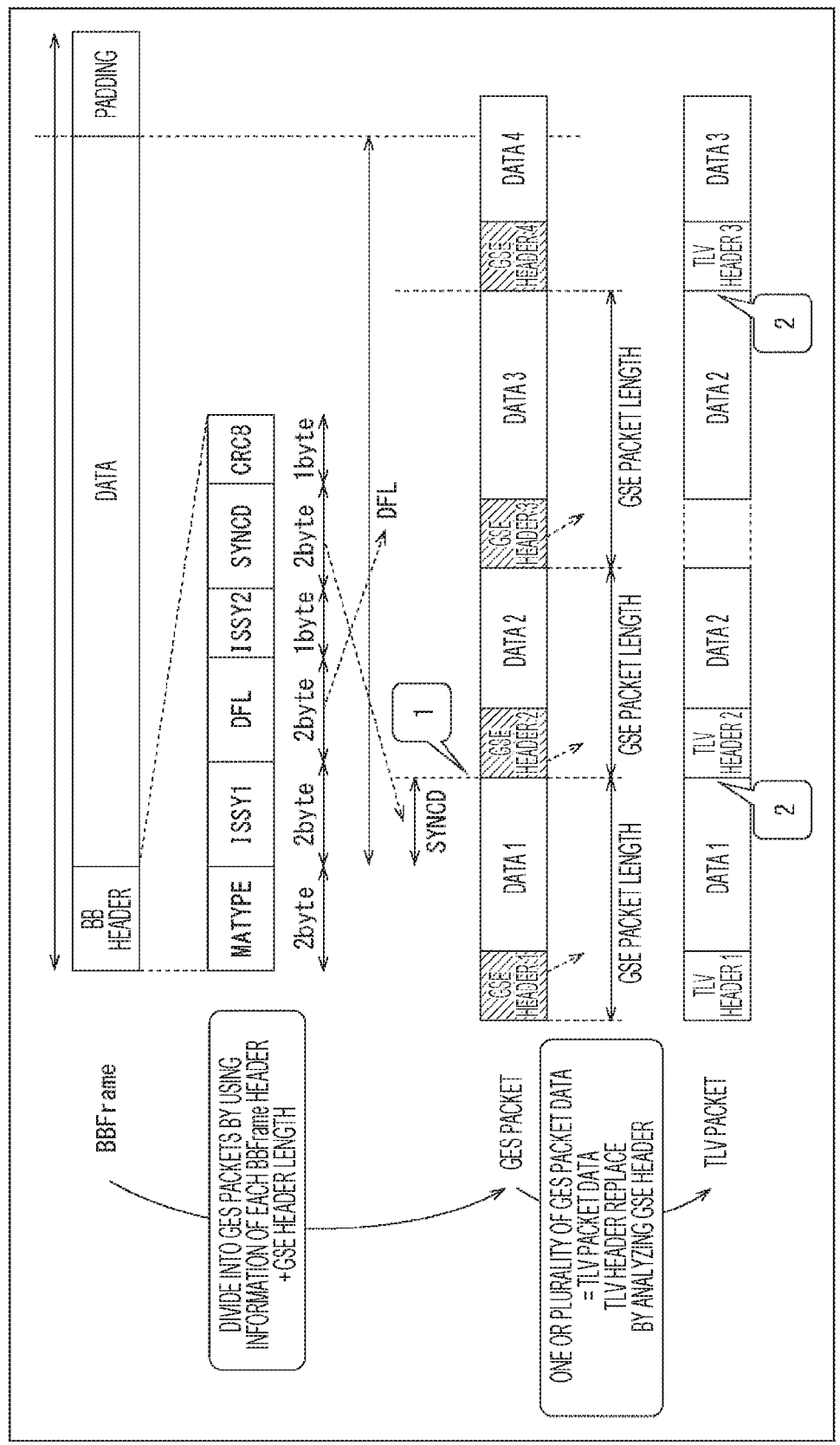
FIG. 26 is a view illustrating a method of detecting packet boundary information in a BB Frame.

In an example in FIG. 26, a BB Frame configuration is illustrated. The BB Frame includes a BB (Frame) Header, a data field, and padding.

The BB (Frame) Header includes 2-byte MATYPE, 2-byte ISSY1, 2-byte DFL, 1-byte ISSY2, 2-byte SYNCD, and 1-byte CRC, in which a position of the data field of the BB Frame is known from the DFL, and a head of the GSE packet is known from the SYNCD.

The GSE packet includes a GSE header and data, and the GSE header includes a GSE packet length.

The TLV packet includes a TLV header and data.

In FIG. 26, for the purpose of description, balloons indicating numbers are illustrated. The packet boundary information may be detected from two types of information indicated by balloons 1 and 2 in FIG. 26.

1 indicates a head TLV indication by the SYNCD of the BB (Frame) Header.

2 indicates TLV division information by the GSE packet header.

Herein, 1 and 2 may be detected from the data string.

That is, by using the information of the BB (Frame) Header and a GSE header length, it is possible to divide into GSE packets. Also, since one or a plurality of GSE packet data=TLV packet data, the TLV header may replace by analyzing the GSE packet header.

As described above, in a case of the example in FIG. 26, the present technology may be applied to error processing when outputting the GSE packet from the BB Frame.

<Configuration Example of Divided TLV Packet>

Figure 27:
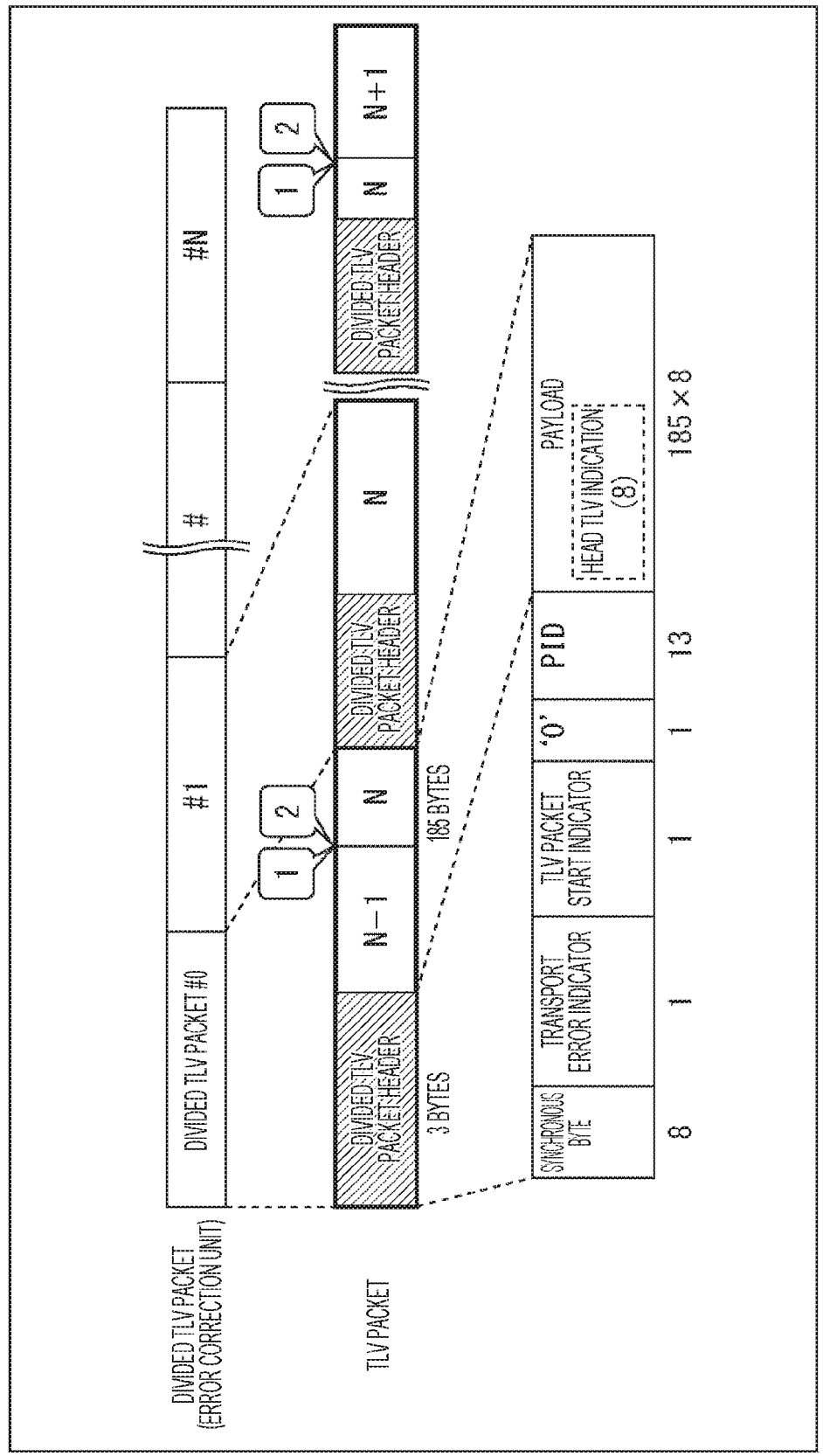
FIG. 27 is a view illustrating a method of detecting the packet boundary information in a divided TLV packet.

Next, with reference to FIG. 27, a method of detecting the TLV packet boundary information in the divided TLV packet is described. In the case of ISDB-C, the TLV packet is subjected to the cable modulation by the cable retransmitting device 211 to be transmitted as the divided TLV packet.

In the example in FIG. 27, a divided TLV packet configuration of an error correction unit is illustrated. The divided TLV packet includes divided TLV packets #0 to #N. The divided TLV packet #0 includes a 3-byte divided TLV packet header and a 185-byte payload part including a part of a TLV packet N−1 and a part of a TLV packet N. Meanwhile, the payload part of the divided TLV packet #1 includes a part of the TLV packet N, and the payload part of the divided TLV packet #2 includes a part of the TLV packet N and a part of a TLV packet N+1.

The divided TLV packet header includes an 8-bit synchronous byte, a 1-bit transport error indicator, a 1-bit TLV packet start indicator, a 1-bit '0', and a 13-bit PID.

If the TLV packet start indicator of the divided TLV packet header indicates that there is a TLV head, the payload part includes an 8-bit head TLV indication, so that the TLV head position may be known.

In FIG. 27, for the purpose of illustration, balloons indicating numbers are illustrated. In the divided TLV packet, the packet boundary information may be detected from two types of information indicated by balloon 1 and balloon 2 in FIG. 27.

1 indicates the head TLV indication by a slot divided TLV packet header.

2 indicates packet length cumulative information of the packet header.

Herein, 1 and 2 may be detected from the data string, and robustness of the information becomes higher in descending order of 1 and 2.

As described above, in the case of the example in FIG. 27, the present technology may be applied to error processing when outputting the original TLV packet from the divided TLV packet.

<Processing Example of Receiving Device>

Next, reception processing by the receiving device 212 is described with reference to a flowchart in FIG. 28.

At step S211, the tuner unit 241 performs the RF processing on the signal modulated to the cable method from the cable retransmitting device 211 and outputs the signal after the RF processing to the demodulation processing unit 242. At step S212, the demodulation processing unit 242 performs the demodulation processing on the signal after the RF processing and outputs the digital signals 0 and 1 obtained as a result of the demodulation to the error correction decoding processing unit 243.

At step S213, the error correction decoding processing unit 243 performs the error correction decoding processing such as LDPC, BCH, Reed Solomon, and convolutional code, and outputs the data string after the error correction decoding processing to the variable length packet processing unit 244.

At step S214, the variable length packet processing unit 244 performs the variable length packet division processing according to whether the error correction of the data string after the error correction processing is successful or failed by using the error correction information from the error correction decoding processing unit 243. Meanwhile, the variable length packet division processing is described later in detail with reference to FIG. 29 and subsequent drawings.

At step S215, the variable length packet processing unit 244 outputs the packet string obtained by the packet division to the data processing device 213 at the subsequent stage.

<Case of BB Frame (J.382)>

Figure 28:
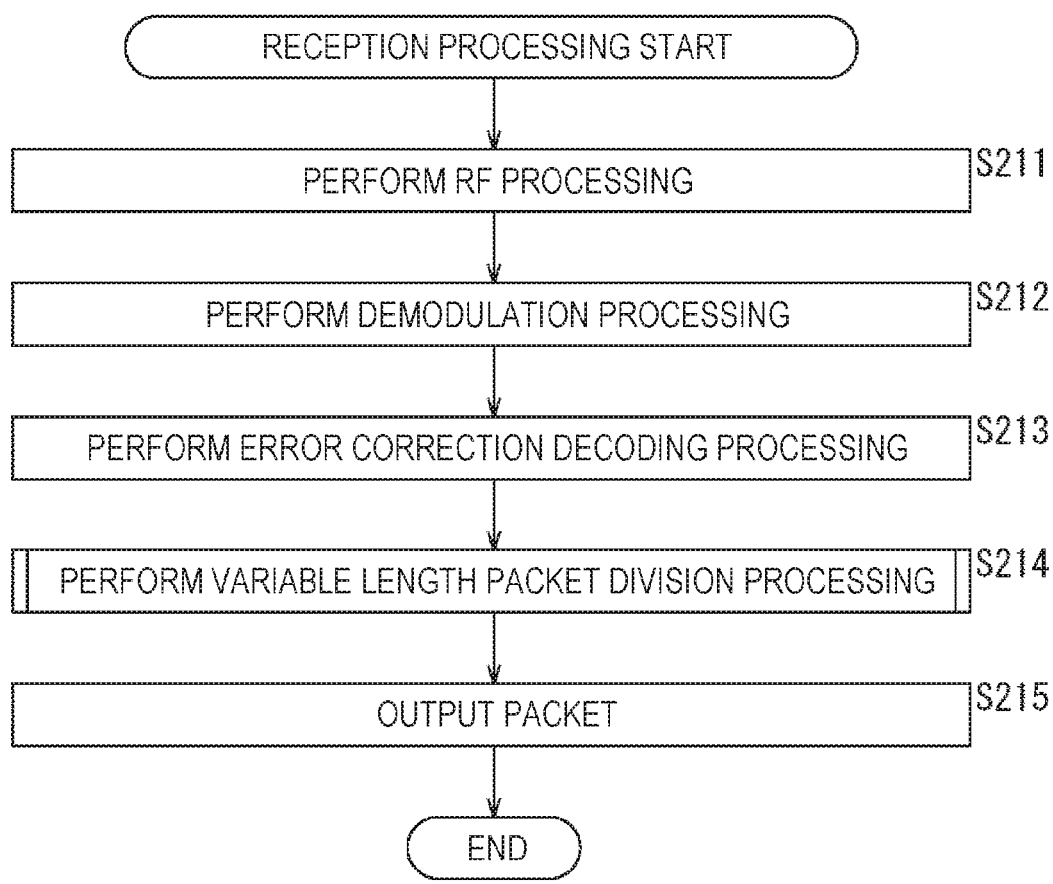
FIG. 28 is a flowchart illustrating reception processing of the receiving device.
Figure 29:
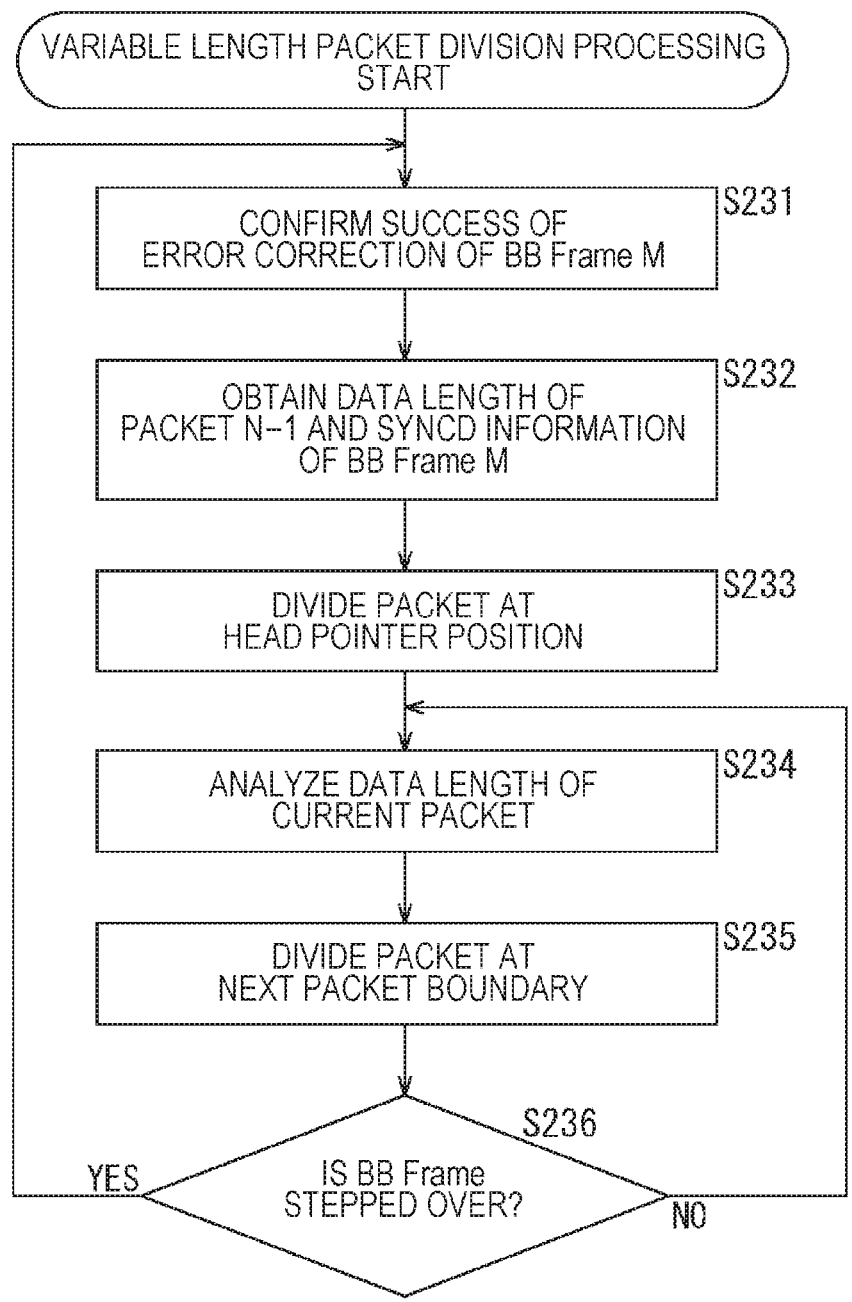
FIG. 29 is a flowchart illustrating variable length packet division processing at step S214 of FIG. 28.

Next, the variable length packet division processing at step S214 in FIG. 28 is described with reference to a flowchart in FIG. 29. Meanwhile, the example in FIG. 29 is an example in which (GSE) packet division is performed upon successful decoding (error correction) of the BB Frame. A number in a balloon in FIG. 30 corresponds to a step number in FIG. 29, and FIG. 29 is illustrated with reference to FIG. 30 appropriately.

Figure 30:
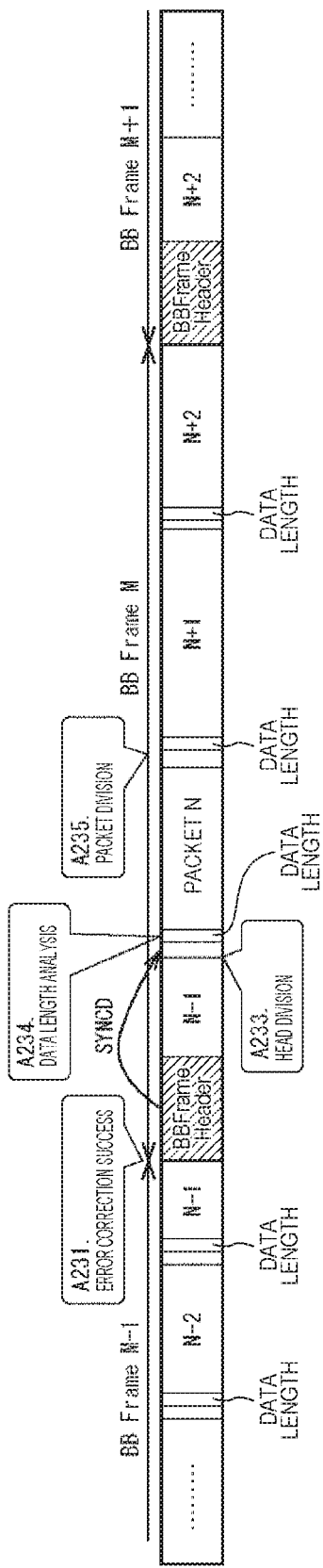
FIG. 30 is a view illustrating the variable length packet division processing in FIG. 29.

At step S231, the information analyzing unit 251 confirms success of the error correction of the BB Frame M (A231 in FIG. 30). At step S232, the packet dividing unit 253 obtains (at least one of) the data length of the packet N−1 and the SYNCD information of the BB Frame M from the information analyzing unit 251.

Since a head pointer position may be known from any information obtained at step S232, the packet dividing unit 253 divides the packet at the head pointer position at step S233 (A233 in FIG. 30). At that time, the packet dividing unit 253 supplies the packet division information to the information analyzing unit 251.

At step S234, the information analyzing unit 251 analyzes the data length of a current packet on the basis of the packet division information from the packet dividing unit 253 (A234 in FIG. 30).

At step S235, the packet dividing unit 253 divides the packet at a next packet boundary obtained from the information analyzing unit 251 (A235 in FIG. 30).

At step S236, the packet dividing unit 253 determines whether the BB Frame is stepped over by division. In a case where it is determined at step S236 that the BB Frame is stepped over, the procedure returns to step S231, and the subsequent processes are repeated. Also, in a case where it is determined at step S236 that the BB Frame is not stepped over, the procedure returns to step S234 and the subsequent processes are repeated.

Figure 31:
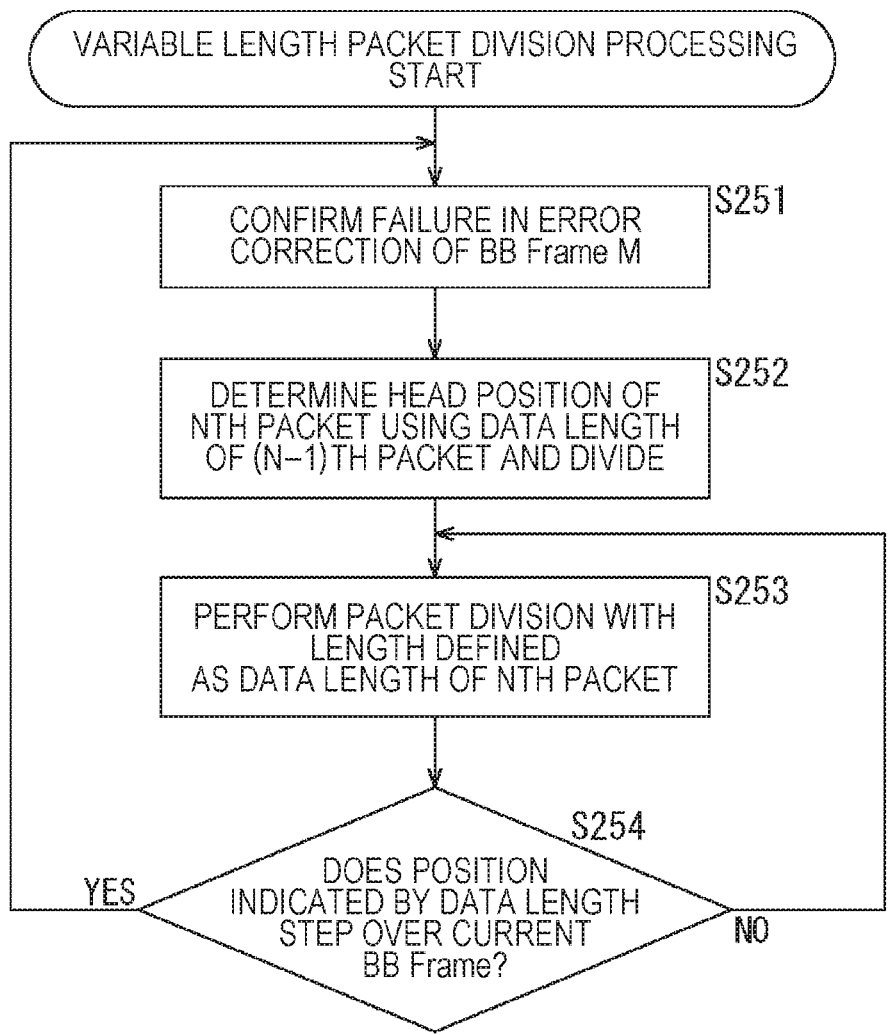
FIG. 31 is a flowchart illustrating the variable length packet division processing at step S214 in FIG. 28.

Next, an example in which the packet division is performed when the decoding of the BB Frame M is failed is described with reference to a flowchart in FIG. 31. FIG. 31 is the flowchart illustrating the variable length packet division processing at step S214 in FIG. 28. Meanwhile, a number in a balloon in FIG. 32 corresponds to a step number in FIG. 31, and FIG. 31 is illustrated with reference to FIG. 32 appropriately.

Figure 32:
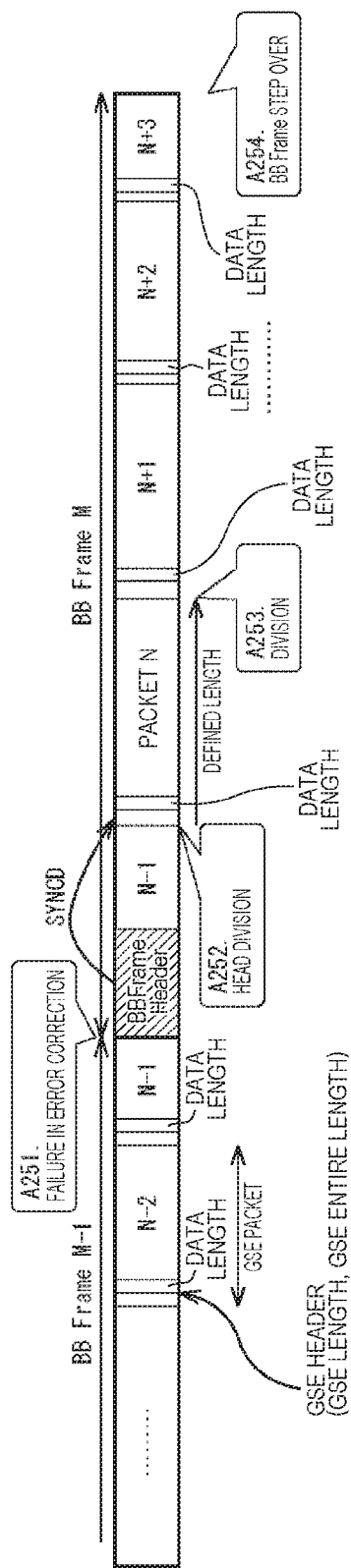
FIG. 32 is a view illustrating the variable length packet division processing in FIG. 31.

At step S251, the information analyzing unit 251 confirms the failure in the error correction of the BB Frame M (A251 in FIG. 32). At step S252, the packet dividing unit 253 determines a head position of an Nth packet by using a data length of an (N−1)th packet to divide (A252 in FIG. 32).

The packet length indicating unit 252 defines the packet length. At step S253, the packet dividing unit 253 performs the packet division with the length defined as the data length of the Nth packet by the packet length indicating unit 252 (A253 in FIG. 32). Meanwhile, the length at that time has following patterns.

The data length is used as it is as the length of the packet.

The data length is ignored and a fixed length is used as a packet length A (for example, a value likely to be used in operation (1500 bytes in a case of cable retransmission of advanced BS broadcasting) is considered).

In a case where the data length is equal to or longer than a certain value X or equal to or shorter than a certain value Y, A is used. Alternatively, X or Y is used.

As described above with reference to FIG. 21 or FIG. 22, a received packet is learned for a certain period, and the data length obtained by learning is used.

Meanwhile, at that time also, overwriting packet division described above with reference to FIGS. 18 to 20 may be performed.

At step S254, the packet dividing unit 253 determines whether a position indicated by the data length steps over a current BB Frame. In a case where it is determined at step S254 that the position indicated by the data length steps over the current BB Frame (A254 in FIG. 32), the procedure returns to step S251, and the subsequent processes are repeated.

On the other hand, in a case where it is determined at step S254 that the position indicated by the data length does not step over the current BB Frame, the procedure returns to step S253, and the subsequent processes are repeated.

That is, in a case where the failure in the error correction of the BB Frame M is confirmed, this procedure is repeated. On the other hand, in a case where the success of the error correction of the BB Frame M is confirmed, the above-described procedure in FIG. 29 is performed.

<Case of Divided TLV Packet (ISDB-C)>

Figure 33:
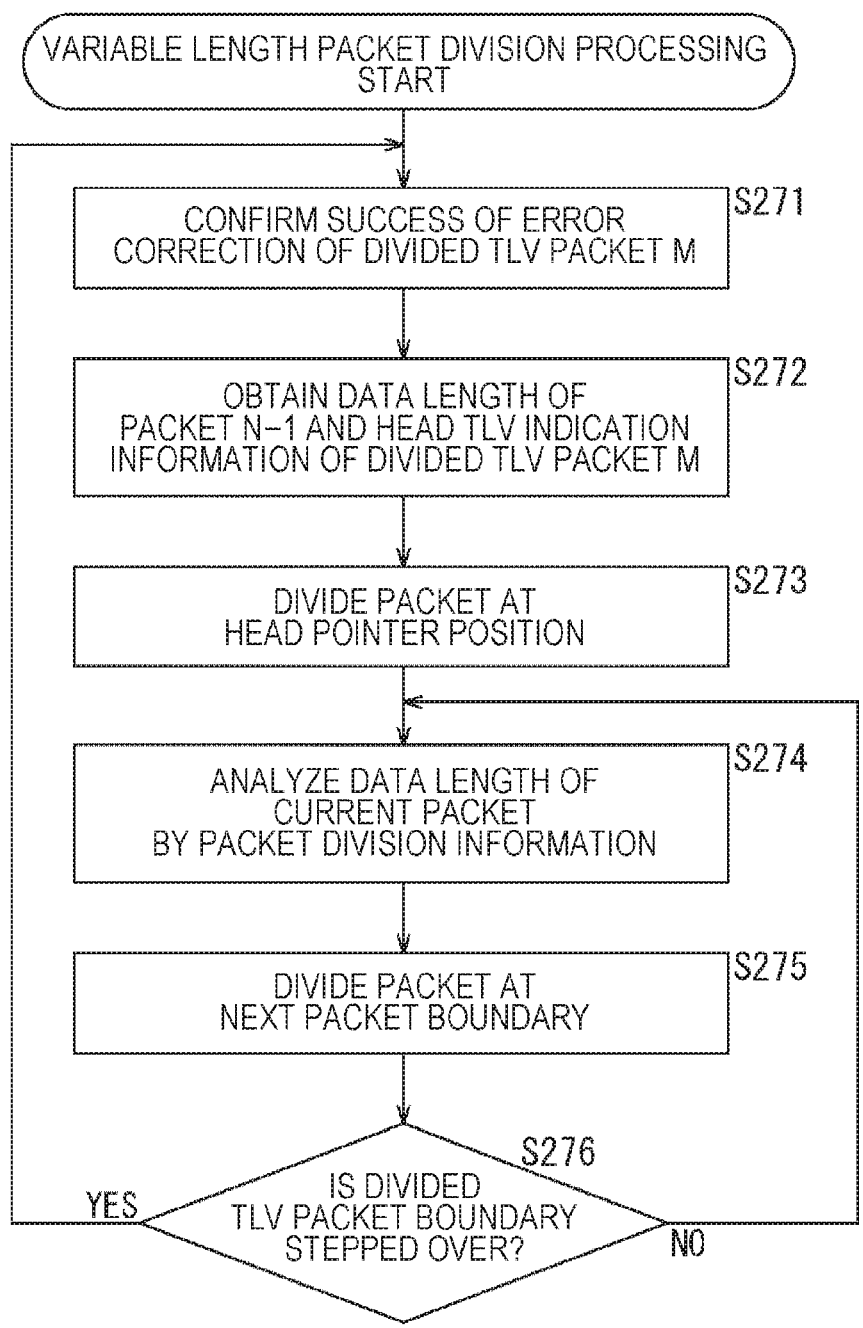
FIG. 33 is a flowchart illustrating the variable length packet division processing at step S214 in FIG. 28.

Next, the variable length packet division processing at step S214 in FIG. 28 is described with reference to a flowchart in FIG. 33. Meanwhile, an example in FIG. 33 is the example in which the packet division is performed when the decoding (error correction) of the divided TLV packet is successful. A number in a balloon in FIG. 34 corresponds to a step number in FIG. 33, and FIG. 33 is illustrated with reference to FIG. 34 appropriately.

Figure 34:
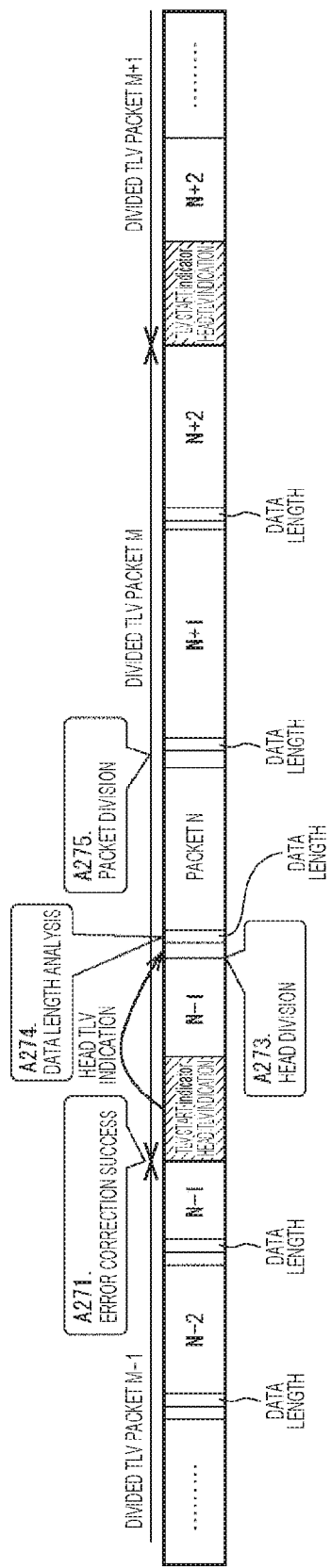
FIG. 34 is a view illustrating the variable length packet division processing in FIG. 33.

At step S271, the information analyzing unit 251 confirms the success of the error correction of the divided TLV packet M (A271 in FIG. 34). At step S272, the packet dividing unit 253 obtains (at least one of) the data length of the packet N-1 and head TLV indication information of the divided TLV packet M from the information analyzing unit 251.

Since the head pointer position may be known from any information obtained at step S272, the packet dividing unit 253 divides the packet at the head pointer position at step S273 (A273 in FIG. 34). At that time, the packet dividing unit 253 supplies the packet division information to the information analyzing unit 251.

At step S274, the information analyzing unit 251 analyzes the data length of the current packet on the basis of the packet division information from the packet dividing unit 253 (A274 in FIG. 34).

At step S275, the packet dividing unit 253 divides the packet at the next packet boundary obtained from the information analyzing unit 251 (A275 in FIG. 34).

At step S276, the packet dividing unit 253 determines whether a divided TLV packet boundary is stepped over by division. In a case where it is determined at step S276 that the divided TLV packet boundary is stepped over, the procedure returns to step S271 and the subsequent processes are repeated. Also, in a case where it is determined at step S276 that the divided TLV packet boundary is not stepped over, the procedure returns to step S274 and the subsequent processes are repeated.

Figure 35:
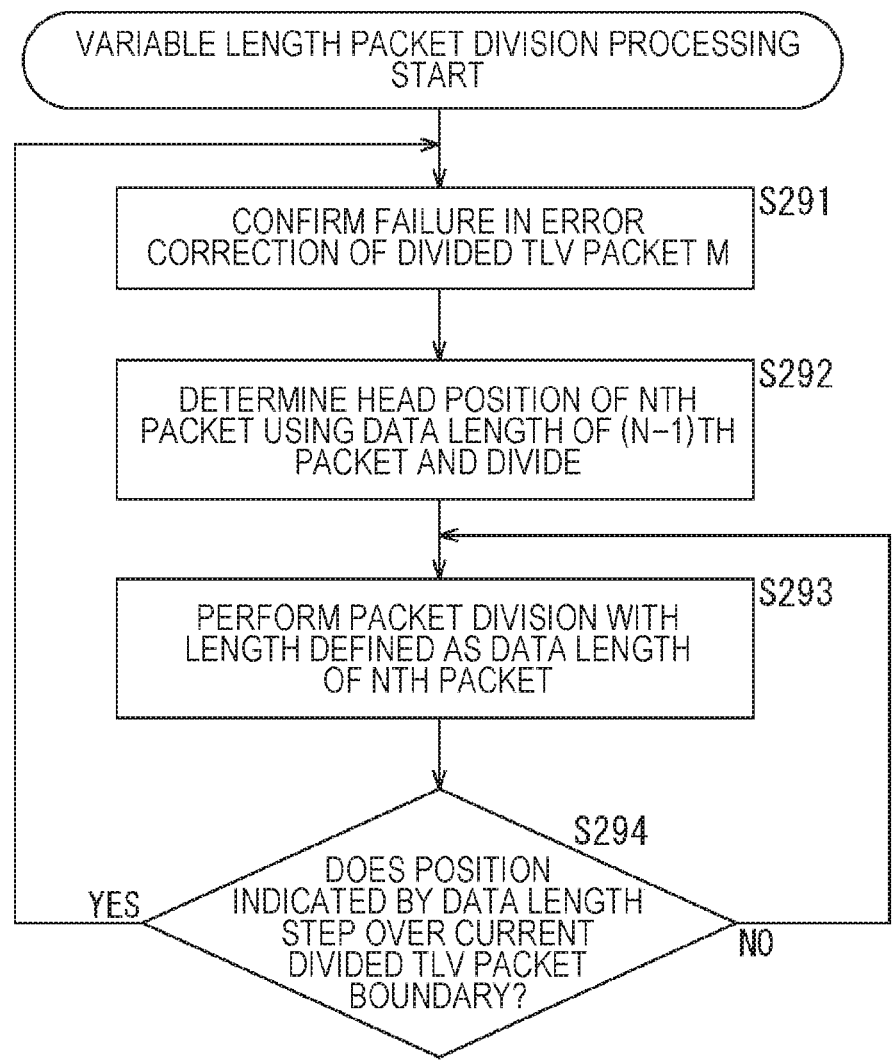
FIG. 35 is a flowchart illustrating the variable length packet division processing at step S214 in FIG. 28.

Next, an example of performing the packet division when the decoding of the divided TLV packet M is failed is described with reference to a flowchart in FIG. 35. FIG. 35 is the flowchart illustrating the variable length packet division processing at step S214 in FIG. 28. Meanwhile, a number in a balloon in FIG. 36 corresponds to a step number in FIG. 35, and FIG. 35 is illustrated with reference to FIG. 36 appropriately.

Figure 36:
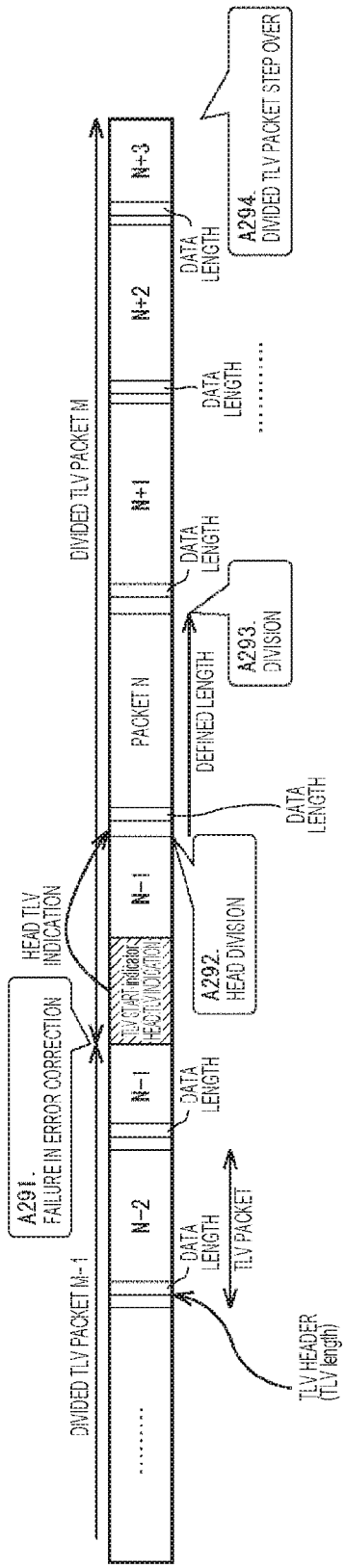
FIG. 36 is a view illustrating the variable length packet division processing in FIG. 35.

At step S291, the information analyzing unit 251 confirms the failure in the error correction of the divided TLV packet M (A291 in FIG. 36). At step S292, the packet dividing unit 253 determines the head position of the Nth packet by using the data length of the (N-1)th packet (A292 in FIG. 36).

The packet length indicating unit 252 defines the packet length. At step S293, the packet dividing unit 253 performs the packet division with the length defined as the data length of the Nth packet by the packet length indicating unit 252 (A293 in FIG. 36). Meanwhile, the length at that time has following patterns.

The data length is used as it is as the length of the packet.

The data length is ignored and a fixed length is used as a packet length A (for example, a value likely to be used in operation (1500 bytes in a case of cable retransmission of advanced BS broadcasting) is considered).

In a case where the data length is equal to or longer than a certain value X or equal to or shorter than a certain value Y, A is used. Alternatively, X or Y is used.

As described above with reference to FIG. 21 or FIG. 22, a received packet is learned for a certain period, and the data length obtained by learning is used.

Meanwhile, at that time also, overwriting packet division described above with reference to FIGS. 18 to 20 may be performed.

At step S294, the packet dividing unit 253 determines whether the position indicated by the data length steps over the current divided TLV packet. In a case where it is determined at step S294 that the position indicated by the data length steps over the current TLV packet (A294 in FIG. 36), the procedure returns to step S291 and the subsequent processes are repeated.

On the other hand, in a case where it is determined at step S294 that the position indicated by the data length does not step over the divided TLV packet, the procedure returns to step S293 and the subsequent processes are repeated.

That is, in a case where the failure in the error correction of the divided TLV packet M is confirmed, this procedure is repeated. On the other hand, in a case where the success of the error correction of the divided TLV packet M is confirmed, the above-described procedure in FIG. 33 is performed.

<Comparison Between Advanced BS Broadcasting and Cable Retransmission>

FIG. 37 is a view illustrating an applicable range of the present technology in the advanced BS broadcasting of the first embodiment and the cable retransmission (ISDB-C, J.382) of the second embodiment.

A packet break position indication by the TMCC information (error tolerance: strong) indicates the first and last packet boundaries in the slot from the TMCC information (error tolerance is strong) in a case of advanced BS (slot→TLV). However, in the cable retransmission ISDB-C (divided TLV→TLV) and the cable retransmission J.382 (BB Frame→GSE), this is not applied because there is no TMCC information.

The packet break position indication by the header (error tolerance: medium) indicates the first packet boundary in the slot from the slot header (error tolerance is medium) in a case of advanced BS (slot→TLV). In a case of the cable retransmission ISDB-C (divided TLV→TLV), a head packet boundary in the divided TLV is indicated using the divided TLV header and the payload. In a case of the cable retransmission J.382 (BB Frame→GSE), the first packet boundary in the BB Frame is indicated.

In the case of the advanced BS (slot→TLV), the packet length indication (error tolerance: medium) indicates the packet length of the TLV of the TLV header. In the case of the cable retransmission ISDB-C (divided TLV→TLV), the packet length of the TLV of the TLV header is indicated. In the case of the cable retransmission J.382 (BB Frame→GSE), the packet length of the GSE in the GSE header is indicated.

Meanwhile, in the case of the cable retransmission J.382 (GSE→TLV), only the header is replaced, so that there is no special error processing function.

As described above, by using the header information and the packet length, it is possible to break the packet at the packet boundary which is correct with probability as high as possible when an error occurs even in the case of the cable retransmission.

That is, in the case of the cable retransmission, it is possible to perform processing similar to that in the case where the TMCC information cannot be used in the advanced BS broadcasting.

As described above, according to the present technology, as for the packet including the data of the block the decoding of which is failed, the packet is divided with the fixed packet length.

As a result, by dividing the packet with the inherent length expected to be actually transmitted, it is possible to send the packet that may not contain an error without invalidating the same as much as possible.

In addition, by setting the inherent length to the upper limit of the packet size, the packet size of the receiver output may always be controlled to be equal to or smaller than the value determined by the standard or the like.

Also, according to the present technology, as for the packet including the data of the block the decoding of which is failed, the data length stored in the header is analyzed, and if the analyzed data length falls within a separately set range of the data lengths, the packet division is performed assuming that the probability of the packet may be confirmed.

As a result, the packet including the block the decoding of which is failed is also divided, so that it possible to send the packet which may not contain the error without invalidating the same as much as possible.

Furthermore, according to the present technology, in a case where the analyzed data length takes a value outside the set range, the packet may be divided with the packet length obtained by dividing with the fixed packet length on the basis of the next byte of the final byte of the final packet the packet division of which is normally performed.

As a result, as for the packet considered to have the error in the data length, by dividing the packet with the inherent length expected to be transmitted, it is possible to send the packet which may not contain the error without invalidating the same as much as possible. Also, by setting the inherent length to the upper limit of the packet size, the packet size of the receiver output may always be controlled to be equal to or smaller than the value determined by the standard or the like.

3. Third Embodiment (Personal Computer)

<Personal Computer>

A series of processes described above may be executed by hardware or by software. In a case where a series of processes is performed by the software, a program which forms the software is installed on a computer. Herein, the computer includes a computer embedded in dedicated hardware, a general-purpose personal computer capable of executing various functions by various programs installed, and the like.

Figure 38:
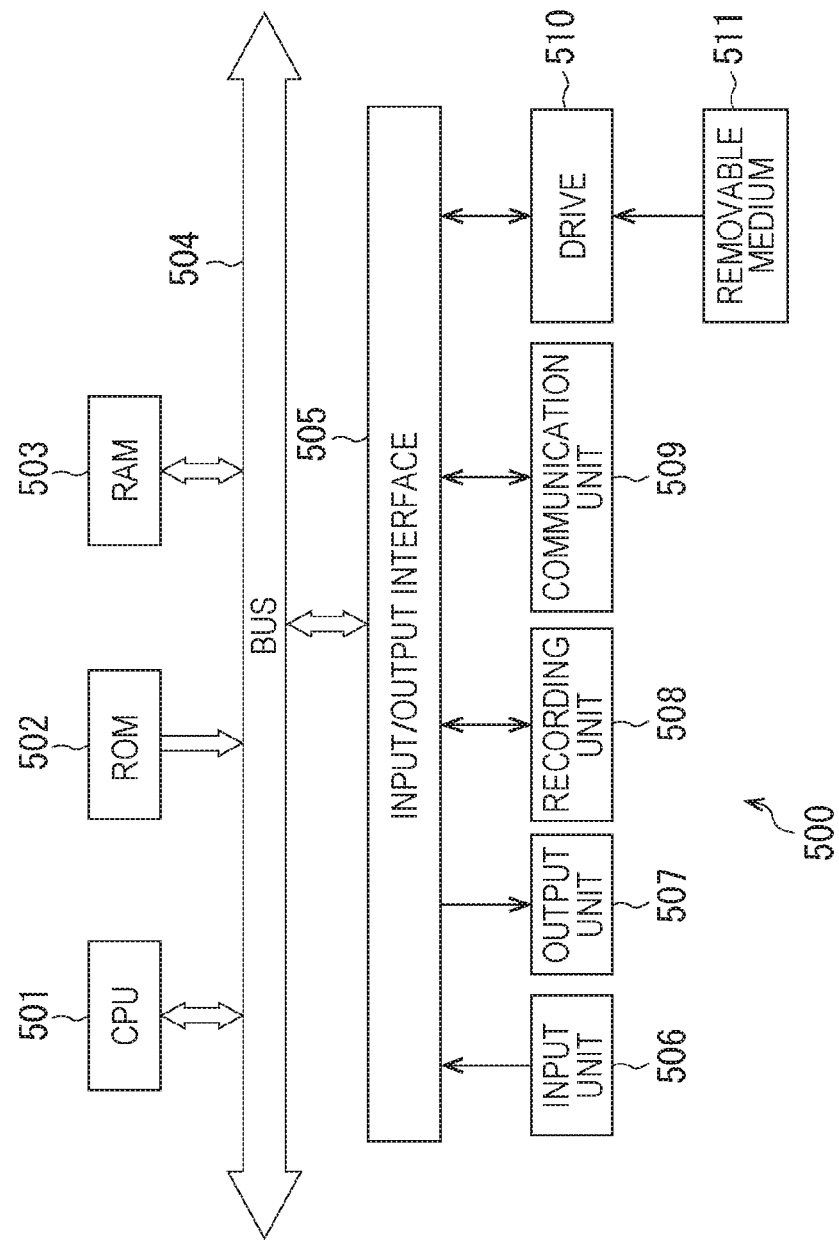
FIG. 38 is a block diagram illustrating a configuration example of a personal computer.

FIG. 38 is a block diagram illustrating a configuration example of hardware of a personal computer which executes the above-described series of processes by a program.

In a personal computer 500, a central processing unit (CPU) 501, a read only memory (ROM) 502, and a random-access memory (RAM) 503 are connected to one another through a bus 504.

An input/output interface 505 is further connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker and the like. The storage unit 508 includes a hard disk, a non-volatile memory and the like. The communication unit 509 includes a network interface and the like. The drive 510 drives a removable medium 511 such as a magnetic disk, an optical disk, a magnetooptical disk, or a semiconductor memory.

In the personal computer 500 configured in the above-described manner, the CPU 501 loads the program stored in the storage unit 508, for example, on the RAM 503 through the input/output interface 505 and the bus 504 to execute. As a result, the series of processes described above is performed.

The program executed by the computer (CPU 501) may be recorded on the removable medium 511 to be provided. The removable medium 511 is, for example, a package medium including a magnetic disk (including a flexible disk), an optical disk (a compact disc-read only memory (CD-ROM), a digital versatile disc (DVD) and the like), a magnetooptical disk, a semiconductor memory, or the like. Also, the program may be provided by means of a wired or wireless transmission medium such as a local area network, the Internet, and digital broadcasting.

In the computer, the program may be installed on the storage unit 508 through the input/output interface 505 by mounting the removable medium 511 on the drive 510. Also, the program may be received by the communication unit 509 through the wired or wireless transmission medium to be installed on the storage unit 508. In addition, the program may be installed in advance on the ROM 502 and the storage unit 508.

Meanwhile, the program executed by the computer may be the program of which processes are performed in chronological order in the order described in this specification or may be the program of which processes are performed in parallel or at required stage such as when a call is issued.

Also, in this specification, a step of describing the program recorded in the recording medium includes not only the processes performed in chronological order in the described order but also the processes executed in parallel or individually which are not necessarily performed in chronological order.

Also, in this specification, a system means an entire apparatus including a plurality of devices (apparatuses).

Meanwhile, the embodiment in the present disclosure is not limited to the above-described embodiments; various modifications may be made without departing from the scope of the present disclosure.

For example, the present disclosure may be configured as cloud computing in which one function is shared by a plurality of devices through a network for processing in cooperation.

It is also possible to divide the configuration described above as one device (or processor) into a plurality of devices (or processors). Other way round, it is also possible to put the configurations described above as a plurality of devices (or processors) together as one device (or processor). Also, of course, it is possible that a configuration other than the above-described one is added to the configuration of each device (or each processor). Furthermore, it is also possible that a part of the configuration of a certain device (or processor) is included in the configuration of another device (or another processor) as long as a configuration and operation as an entire system are substantially the same. That is, the present technology is not limited to the above-described embodiments and various modifications may be made without departing from the spirit of the present technology.

Although the preferred embodiments of the present disclosure are described above in detail with reference to the attached drawings, the disclosure is not limited to such examples. It is clear that one of ordinary skill in the field of the technology to which the present disclosure belongs may conceive of various modifications and corrections within the scope of the technical idea recited in claims and it is understood that they also naturally belong to the technical scope of the present disclosure.

Meanwhile, the present technology may also have following configurations.

(1) A receiving device provided with:

an information analyzing unit which analyzes packet information regarding a packet from a transmitted multiplexed stream;

a packet length indicating unit which defines a packet length; and a packet dividing unit which divides the multiplexed stream into packets by using at least one of the packet information analyzed by the information analyzing unit and the packet length defined by the packet length indicating unit.

(2) The receiving device according to (1) described above, in which the packet dividing unit divides the multiplexed stream into packets by using the packet length in the packet information analyzed by the information analyzing unit or the packet length indicating the packet length defined by the packet length indicating unit according to a comparison result between the packet length in the packet information analyzed by the information analyzing unit and a range of the packet length defined by the packet length indicating unit.

(3) The receiving device according to (2) described above, in which the packet dividing unit divides the multiplexed stream into packets by using the packet length in the packet information in a case where it is determined that the packet length in the packet information analyzed by the information analyzing unit falls within the range of the packet length defined by the packet length indicating unit.

(4) The receiving device according to (2) or (3) described above, in which the packet dividing unit divides the multiplexed stream into packets by using the packet length defined by the packet length indicating unit in a case where it is determined that the packet length in the packet information analyzed by the information analyzing unit is out of the range of the packet length defined by the packet length indicating unit.

(5) The receiving device according to any one of (1) to (4) described above, in which, in a case where the packet divided on the basis of the packet length defined by the packet length indicating unit is the packet having a non-standard short packet length, the packet dividing unit adjusts a divided position with an immediately preceding packet length or invalidates the packet having the short packet length.

(6) The receiving device according to any one of (1) to (5) described above, in which the packet dividing unit rewrites header information of an immediately preceding packet when dividing the packet.

(7) The receiving device according to (6) described above, in which the header information is a synchronous byte, type information, or a data length at the time of division.

(8) The receiving device according to any one of (1) to (5) described above, in which the packet dividing unit adds additional information defined by a transmission protocol when dividing the packet.

(9) The receiving device according to any one of (1) to (8) described above, in which the packet length indicating unit defines the packet length by using a result of learning the packet length from the packet length with which division processing is performed previously.

(10) The receiving device according to any one of (1) to (9) described above, in which the packet length indicating unit defines a range of the packet length by using a result of learning the packet length from the packet length with which the division processing is performed previously.

(11) The receiving device according to any one of (1) to (10) described above, in which the packet is a type length value (TLV) packet.

(12) The receiving device according to any one of (1) to (11) described above, in which the packet information is at least one of transmission and multiplexing configuration control information (TMCC information), slot header information, and data length information.

(13) The receiving device according to any one of (1) to (11) described above, in which the packet information is at least one of BB Frame header information and data length information.

(14) The receiving device according to claim any one of (1) to (11) described above, in which the packet information is at least one of divided TLV packet header information and data length information.

(15) A receiving method, provided with:

analyzing packet information regarding a packet from a transmitted multiplexed stream;

defining a packet length; and dividing the multiplexed stream into packets by using at least one of analyzed packet information and defined packet length by a receiving device.

(16) A communicating system provided with:

a transmitting device provided with a transmitting unit which divides a signal into packets and transmits a multiplexed stream obtained by multiplexing the divided packets; and a receiving device provided with an information analyzing unit which analyzes packet information regarding the packet from the multiplexed stream transmitted by the transmitting device;

a packet length indicating unit which defines a packet length; and a packet dividing unit which divides the multiplexed stream into packets by using at least one of the packet information analyzed by the information analyzing unit and the packet length indicating the packet length defined by the packet length indicating unit.

REFERENCE SIGNS LIST

1 Communicating system
11 Transmitting device
12 Receiving device
13 Antenna
14 Data processing device
21 Tuner unit
22 Demodulation processing unit
23 Error correction decoding processing unit
24 Variable length packet processing unit
41 Information analyzing unit
42 Packet length indicating unit
43 Packet dividing unit
201 Cable retransmitting system
211 Cable retransmitting device
212 Receiving device
213 Data processing device
221 Antenna
222 Satellite tuner
223 Convertor/multiplexer
224 Cable modulator
225 Transmitting unit
241 Tuner unit
242 Demodulation processing unit
243 Error correction decoding processing unit
244 Variable length packet processing unit
251 Information analyzing unit
252 Packet length indicating unit
253 Packet dividing unit

The invention claimed is:

1. A receiving device comprising:
an information analyzing unit which analyzes packet information regarding packets from a transmitted multiplexed stream to provide analyzed packet information;
a packet length indicating unit which provides a defined packet length; and
a packet dividing unit which divides the multiplexed stream into packets by using at least one of the analyzed packet information and the defined packet length,
wherein, in a case where a given packet is divided on the basis of the defined packet length and has a non-standard short packet length, the packet dividing unit adjusts a divided position with an immediately preceding packet length or invalidates the given packet having the non-standard short packet length.

2. The receiving device according to claim 1,
wherein the packet dividing unit divides the multiplexed stream into packets by using the analyzed packet information or the defined packet length according to a comparison result between an analyzed packet length from the analyzed packet information and a range of the defined packet length.

3. The receiving device according to claim 2,
wherein the packet dividing unit divides the multiplexed stream into packets by using the analyzed packet length in a case where it is determined that the analyzed packet length falls within the range of the defined packet length.

4. The receiving device according to claim 2,
wherein the packet dividing unit divides the multiplexed stream into packets by using the defined packet length in a case where it is determined that the analyzed packet length is out of the range of the defined packet length.

5. The receiving device according to claim 1,
wherein the packet dividing unit adds additional information defined by a transmission protocol when dividing the multiplexed stream into packets.

6. The receiving device according to claim 1,
wherein the packet length indicating unit defines the packet length by using a result of learning the packet length from at least one previously identified packet length from prior division processing.

7. The receiving device according to claim 1,
wherein the packet length indicating unit defines a range of the packet length by using a result of learning the packet length from previously identified packet lengths from prior division processing.

8. The receiving device according to claim 1,
wherein at least one of the packets is a type length value (TLV) packet.

9. The receiving device according to claim 1,
wherein the packet information is at least one of transmission and multiplexing configuration control information (TMCC information), slot header information, and data length information.

10. The receiving device according to claim 1,
wherein the packet information is at least one of BB Frame header information and data length information.

11. The receiving device according to claim 1,
wherein the packet information is at least one of divided TLV packet header information and data length information.

12. A communicating system comprising:
a receiving device according to claim 1; and
a transmitting device that transmits the multiplexed stream.

13. A receiving device, comprising:
an information analyzing unit which analyzes packet information regarding packets from a transmitted multiplexed stream to provide analyzed packet information;
a packet length indicating unit which provides a defined packet length; and
a packet dividing unit which divides the multiplexed stream into packets by using at least one of the analyzed packet information and the defined packet length,
wherein the packet dividing unit rewrites header information of an immediately preceding packet when dividing a given packet.

14. The receiving device according to claim 13,
wherein the header information is a synchronous byte, type information, or a data length at the time of division.

15. A communicating system comprising:
a receiving device according to claim 13; and
a transmitting device that transmits the multiplexed stream.

16. A receiving method, comprising:
accessing analyzed packet information regarding packets from a transmitted multiplexed stream;
receiving an indication of a defined packet length; and dividing the multiplexed stream into packets by using at least one of the analyzed packet information and the defined packet length, wherein, in a case where a given packet is divided on the basis of the defined packet length and has a non-standard short packet length, said dividing the multiplexed stream comprises adjusting a divided position with an immediately preceding packet length or invalidating the given packet having the non-standard short packet length.

17. A non-transitory computer readable medium storing program code for receiving a multiplexed stream, the program code being executable by a processor to perform operations comprising:

analyzing packet information regarding packets from a transmitted multiplexed stream to provide analyzed packet information;

receiving an indication of a defined packet length; and dividing the multiplexed stream into packets by using at least one of the analyzed packet information and the defined packet length, wherein, in a case where a given packet is divided on the basis of the defined packet length and has a non-standard short packet length, said dividing the multiplexed stream comprises adjusting a divided position with an immediately preceding packet length or invalidating the given packet having the non-standard short packet length.

18. The non-transitory computer readable medium according to claim 17, wherein said dividing the multiplexed stream comprises dividing the multiplexed stream into packets by using the analyzed packet information or the defined packet length according to a comparison result between an analyzed packet length from the analyzed packet information and a range of the defined packet length.

19. The non-transitory computer readable medium according to claim 18, wherein said dividing the multiplexed stream comprises dividing the multiplexed stream into packets by using the analyzed packet length in a case where it is determined that the analyzed packet length falls within the range of the defined packet length.

20. The non-transitory computer readable medium according to claim 18, wherein said dividing the multiplexed stream comprises dividing the multiplexed stream into packets by using the defined packet length in a case where it is determined that the analyzed packet length is out of the range of the defined packet length.

* * * * *